(12) United States Patent
Cohen

(10) Patent No.: US 8,955,624 B2
(45) Date of Patent: *Feb. 17, 2015

(54) RETROFITTING A VEHICLE TO TRANSFER MECHANICAL POWER OUT OF AN ENGINE COMPARTMENT

(71) Applicant: Aura Systems Inc., Redondo Beach, CA (US)

(72) Inventor: Yedidia Cohen, Beverly Hills, CA (US)

(73) Assignee: Aura Systems Inc., Redondo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/145,523

(22) Filed: Dec. 31, 2013

(65) Prior Publication Data

US 2014/0113756 A1    Apr. 24, 2014

Related U.S. Application Data

(63) Continuation of application No. 13/348,648, filed on Jan. 12, 2012, now Pat. No. 8,720,618.

(60) Provisional application No. 61/516,071, filed on Mar. 28, 2011.

(51) Int. Cl.
*B60K 6/42* (2007.10)
*F16H 7/02* (2006.01)
*B60K 25/02* (2006.01)

(52) U.S. Cl.
CPC  *F16H 7/02* (2013.01); *B60K 25/02* (2013.01); *B60Y 2304/076* (2013.01)
USPC ..................................... 180/65.22

(58) Field of Classification Search
USPC ............................................ 180/65.21–65.29
See application file for complete search history.

(56) References Cited

U.S. PATENT DOCUMENTS

| 1,481,405 | A | 1/1924 | Anglada | 180/57 |
| 2,612,249 | A | 9/1952 | Horn | 192/104 R |
| 5,667,029 | A | 9/1997 | Urban et al. | 180/65.2 |
| 5,704,440 | A | 1/1998 | Urban et al. | 180/65.2 |
| 5,898,244 | A | 4/1999 | Kotsianas et al. | 310/14 |
| 6,093,974 | A | 7/2000 | Tabata et al. | 290/40 R |
| 6,157,175 | A | 12/2000 | Morinigo et al. | 322/28 |
| 6,394,215 | B1 | 5/2002 | Masuda | 180/232 |

(Continued)

*Primary Examiner* — Jeffrey J Restifo
*Assistant Examiner* — Erez Gurari
(74) *Attorney, Agent, or Firm* — Imperium Patent Works; T. Lester Wallace; Amir V. Adibi

(57) ABSTRACT

A vehicle is retrofitted with a secondary power generation system having a Mechanical Power Transfer System (MPTS) and an electrical generator. The MPTS transfers power from an engine crankshaft within an engine compartment to a generator shaft of the electrical generator disposed outside of the engine compartment. Retrofitting the vehicle with the MPTS allows the electrical generator to be attached to a portion of a chassis of the vehicle that is outside of the engine compartment. Attachment of the electrical generator outside the engine compartment avoids the tight space constraints and harsh operating conditions (high operating temperatures) within the engine compartment. Thus a larger, more powerful generator that requires less maintenance is realized. Additionally, the MPTS does not include any Power Take-Off mechanism, clutch system, or disengagement mechanism resulting in more efficient power transfer and in an overall increase in the amount of electrical energy generated than in conventional techniques.

20 Claims, 19 Drawing Sheets

VEHICLE RETROFITTED WITH THE MECHANICAL POWER TRANSFER SYSTEM

(56) References Cited

U.S. PATENT DOCUMENTS

| | | |
|---|---|---|
| 6,501,190 B1 | 12/2002 | Seguchi et al. ............... 290/46 |
| 6,700,214 B2 | 3/2004 | Ulinski et al. ............. 290/40 C |
| 6,700,802 B2 | 3/2004 | Ulinski et al. ................ 363/37 |
| 6,808,033 B2 | 10/2004 | Dare-Bryan ................ 180/65.6 |
| 6,979,913 B2 | 12/2005 | Storm et al. .................. 290/17 |
| 7,057,303 B2 | 6/2006 | Storm et al. ................. 290/1 A |
| 7,647,994 B1 | 1/2010 | Belloso ..................... 180/65.31 |
| 7,915,748 B2 | 3/2011 | Storm et al. .............. 290/40 C |
| 2004/0020697 A1* | 2/2004 | Field ........................... 180/65.2 |
| 2008/0039263 A1 | 2/2008 | Usoro .......................... 475/157 |
| 2008/0051242 A1 | 2/2008 | Usoro .............................. 475/5 |
| 2008/0318729 A1 | 12/2008 | Asao et al. ...................... 477/5 |
| 2009/0314019 A1 | 12/2009 | Fujimoto et al. ............. 62/228.5 |
| 2010/0044129 A1 | 2/2010 | Kyle ........................ 180/65.25 |
| 2010/0236847 A1 | 9/2010 | Yang et al. ................ 180/65.22 |
| 2011/0083916 A1 | 4/2011 | Cimatti et al. ............. 180/65.22 |
| 2011/0087390 A1 | 4/2011 | Pandit et al. .................... 701/22 |
| 2012/0052995 A1 | 3/2012 | Scarbo et al. .................. 474/86 |
| 2012/0068651 A1 | 3/2012 | Stief ............................ 318/461 |
| 2012/0098502 A1 | 4/2012 | Hori ............................ 320/162 |

* cited by examiner

VEHICLE WITH A GENERATOR MOUNTED WITHIN
AN ENGINE COMPARTMENT

VEHICLE RETROFITTED WITH THE MECHANICAL POWER TRANSFER SYSTEM

MECHANICAL POWER TRANSFER SYSTEM

SECOND COUPLING DEVICE

PATH OF POWER TRANSFER FROM PRIME MOVER
COMPARTMENT TO THE GENERATOR

RPM OF GENERATOR SHAFT VERSUS RPM OF CRANKSHAFT

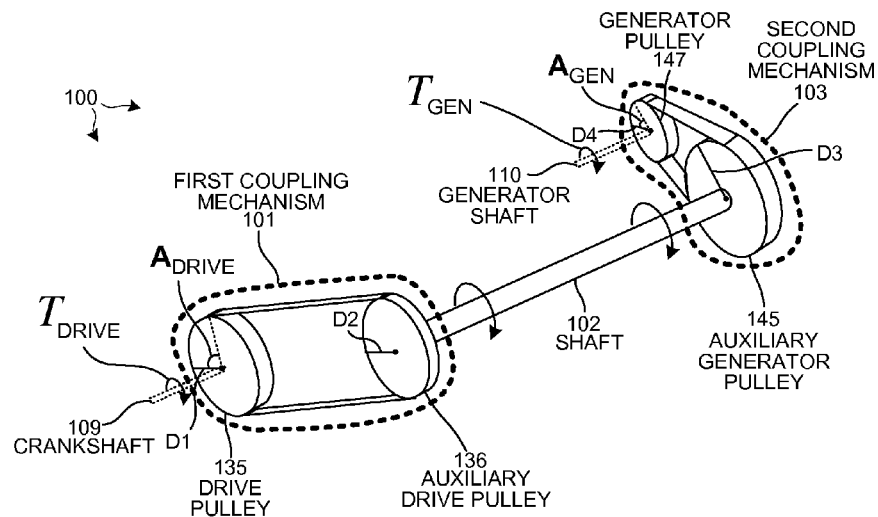

MECHANICAL POWER TRANSFER SYSTEM

FIG. 9

ANGULAR DISPLACEMENT OF GENERATOR SHAFT → $A_{GEN} = A_{DRIVE} \times \overset{SR1}{\left(\frac{D1}{D2}\right)} \times \overset{SR2}{\left(\frac{D3}{D4}\right)}$

↑ ANGULAR DISPLACEMENT OF CRANKSHAFT

EQUATION FOR ANGULAR DISPLACEMENT OF GENERATOR SHAFT

FIG. 10

TORQUE ON GENERATOR SHAFT → $T_{GEN} = T_{DRIVE} \times \overset{SR1}{\left(\frac{D1}{D2}\right)} \times \overset{SR2}{\left(\frac{D3}{D4}\right)}$

EQUATION FOR TORQUE ON GENERATOR SHAFT

FIG. 11

BACK VIEW OF
DRIVE PULLEY

FRONT VIEW OF
DRIVE PULLEY

SIDE VIEW OF
DRIVE PULLEY

FRONT CROSS-SECTION OF
DRIVE PULLEY

SIDE CROSS-SECTION OF
DRIVE PULLEY

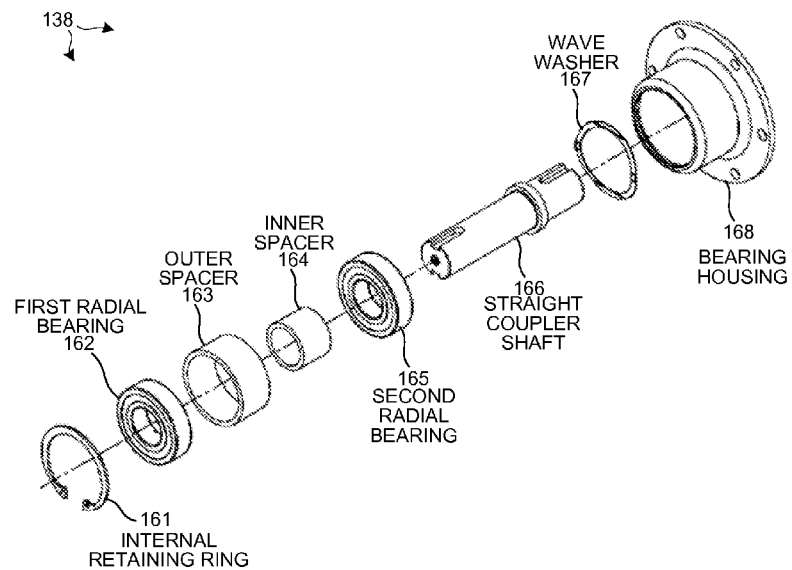
FIG. 17
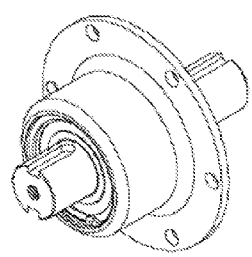
PERSPECTIVE VIEW OF
BEARING HOUSING ASSEMBLY
FIG. 18
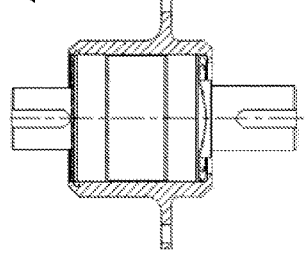
SIDE CROSS-SECTION OF
BEARING HOUSING ASSEMBLY
FIG. 19

BACK VIEW OF
GENERATOR PULLEY

FRONT VIEW OF
GENERATOR PULLEY

SIDE VIEW OF
GENERATOR PULLEY

FRONT CROSS-SECTION OF
GENERATOR PULLEY

SIDE CROSS-SECTION OF
GENERATOR PULLEY

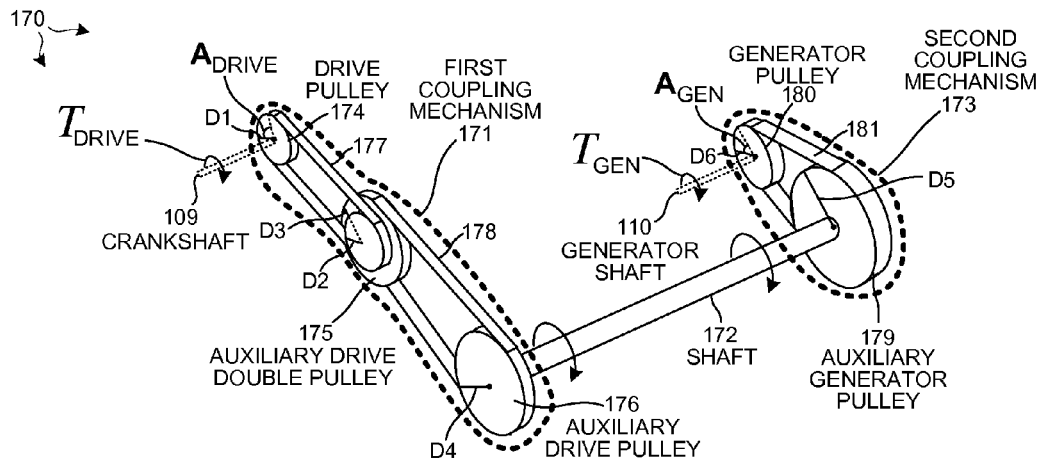

POWER TRANSFER SYSTEM WITH A DOUBLE PULLEY

FIG. 25

$$A_{GEN} = A_{DRIVE} \times \overbrace{\left(\frac{D1}{D2}\right) \times \left(\frac{D3}{D4}\right)}^{SR1} \times \overbrace{\left(\frac{D5}{D6}\right)}^{SR2}$$

EQUATION FOR ANGULAR DISPLACEMENT OF GENERATOR SHAFT

FIG. 26

$$T_{GEN} = T_{DRIVE} \times \overbrace{\left(\frac{D1}{D2}\right) \times \left(\frac{D3}{D4}\right)}^{SR1} \times \overbrace{\left(\frac{D5}{D6}\right)}^{SR2}$$

EQUATION FOR TORQUE ON GENERATOR PULLEY

FIG. 27

EXPLODED VIEW OF DOUBLE PULLEY

SIDE CROSS-SECTION OF DOUBLE PULLEY

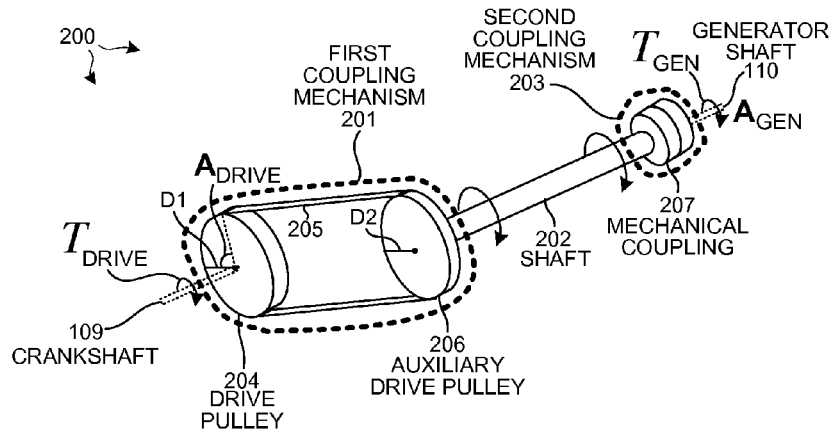

POWER TRANSFER SYSTEM WITH A MECHANICAL COUPLING

FIG. 30

$$A_{GEN} = A_{DRIVE} \times \left(\frac{D1}{D2}\right) \times 1$$

- $A_{GEN}$: ANGULAR DISPLACEMENT OF GENERATOR SHAFT
- SR1
- SR2
- ANGULAR DISPLACEMENT OF CRANKSHAFT

EQUATION FOR ANGULAR DISPLACEMENT OF GENERATOR SHAFT

FIG. 31

$$T_{GEN} = T_{DRIVE} \times \left(\frac{D1}{D2}\right) \times 1$$

- $T_{GEN}$: TORQUE ON GENERATOR SHAFT
- SR1
- SR2
- TORQUE ON CRANKSHAFT

EQUATION FOR TORQUE ON GENERATOR SHAFT

FIG. 32

CONVENTIONAL POWER TRANSFER SYSTEM THAT UTILIZES A PTO UNIT

RETROFITTING A VEHICLE TO TRANSFER MECHANICAL POWER OUT OF AN ENGINE COMPARTMENT

CROSS REFERENCE TO RELATED APPLICATIONS

This application is a continuation of, and claims the benefit under 35 U.S.C. §120 from, nonprovisional U.S. patent application Ser. No. 13/348,648, entitled "Retrofitting A Vehicle To Transfer Mechanical Power Out Of An Engine Compartment," filed on Jan. 12, 2012. U.S. patent application Ser. No. 13/348,648 claims the benefit under 35 U.S.C. §119 from provisional U.S. patent application Ser. No. 61/516,071, entitled "Mechanically Transferring Power From An Engine To A Generator Located Outside An Engine Compartment," filed on Mar. 28, 2011. This application incorporates by reference nonprovisional U.S. patent application Ser. No. 13/348,648. This application also incorporates by reference provisional U.S. patent application Ser. No. 61/516,071.

TECHNICAL FIELD

The described embodiments relate to drawing engine power out of an engine compartment.

BACKGROUND INFORMATION

Wheeled automotive vehicles typically include a primary power generation system that converts mechanical power drawn from an engine crankshaft into electrical energy. The electrical energy is then consumed by components present on the vehicle. In the example of FIG. 1 (Prior Art), a wheeled automotive vehicle 10 includes an engine 11 and an engine crankshaft 12 disposed within an engine compartment 13. Vehicle 10 includes a power generation system comprising alternator 14. Alternator 14 draws power from crankshaft 12 via belt 15. Alternator 14 converts the mechanical power drawn from engine 11 into electrical energy in the form of an Alternating Current (AC) voltage. The electrical energy is converted into a Direct Current (DC) voltage by inverter 16 and supplied to battery 17.

Although vehicle 10 already includes alternator 14, an owning entity that operates vehicle 10 may decide to incorporate secondary components into vehicle 10 that consume a large amount of power. In order to satisfy the high power requirements of such secondary components, the owning entity decides to equip vehicle 10 with a secondary power generation system. In the example of FIG. 1 (Prior Art), vehicle 10 is retrofitted with electrical generator 18. Electrical generator 18 is attached within engine compartment 13 and draws mechanical power from engine crankshaft 12 via belt 19. Electrical generator 18 converts the mechanical power drawn from engine 11 into electrical energy that is supplied to an electrical control unit 20. Electrical Control Unit (ECU) 20 distributes power to the secondary components present on vehicle 10. FIG. 2 (Prior Art) is a perspective diagram of engine compartment 13 after vehicle 10 is retrofitted to include generator 18.

Several disadvantages result from installing generator 18 within engine compartment 13. First, all components to be installed within engine compartment 13 must be able to withstand the harsh conditions (high operating temperatures and high vibration) of the engine compartment 13. For example, temperatures in engine compartment 13 usually exceed temperatures of 200 degrees Fahrenheit. Such components that are installed in engine compartment 13 must be rated for operating under these extreme conditions making such components more costly to produce. Second, components attached within the engine compartment are difficult to maintain as compared to components residing outside of the engine compartment. Third, engine compartment 13 has a limited amount of physical area for attaching additional components. A significant problem arises if there are demanding power generation requirements where a large generator is required that does not fit within engine compartment 13. A solution is desired that overcomes these challenges.

SUMMARY

A wheeled automotive vehicle is retrofitted with a secondary power generation system having a Mechanical Power Transfer System (MPTS) and an electrical generator. An owning entity acquires the vehicle from a manufacturing entity. The vehicle as it is received from the manufacturing entity, includes a primary power generation system, for example an alternator. The alternator is contained within an engine compartment of the vehicle, and draws mechanical power from an engine crankshaft of the vehicle. The alternator converts the mechanical power drawn from the engine crankshaft into electrical energy that can be consumed by other components of the vehicle. For example, the electrical energy is used to a charge a vehicle battery contained within the engine compartment. Due to the limited power generated by the primary power generation system, the owning entity decides to retrofit the vehicle with a secondary power generation system for providing power to other equipment and devices present on the vehicle. In one example, the vehicle is a commercial truck having a refrigeration system. The refrigeration system consumes much more power than can be delivered by the primary power generation system. In order to support such a high-power consumption device, the owning entity provides the vehicle to a retrofitting entity that retrofits the vehicle with the secondary power generation system.

The retrofitting entity retrofits the vehicle to include the MPTS and the electrical generator. The retrofitting entity installs the electrical generator to a portion of the chassis (or vehicle body) that is outside of the engine compartment. By installing the electrical generator outside the engine compartment, a larger and more powerful electrical generator can be realized. If the retrofitting entity were to install the electrical generator within the engine compartment, then the electrical generator selected would be smaller in size due to the tight space constraints within the engine compartment. Moreover, due to the harsh operating conditions within the engine compartment (such as high temperatures and extreme vibrations), installment of the electrical generator outside the engine compartment avoids these conditions that tend to wear and ultimately damage the generator.

The retrofitting entity utilizes the MPTS to transfer power out of the engine compartment to the electrical generator. The MPTS forms a mechanical linkage that includes a first coupling mechanism, a shaft, and a second coupling mechanism. The retrofitting entity couples the first coupling mechanism to the engine crankshaft and to a first end of the shaft, and couples the second coupling mechanism to the second end of the shaft and to the generator shaft. The mechanical linkage formed by the MPTS extends from the engine crankshaft, through the engine compartment, and onto the generator crankshaft. By installing the MPTS in this fashion, the MPTS effectively couples the engine crankshaft to the generator shaft. Additionally, the mechanical linkage does not include any Power Take-Off mechanism (such as a PTO unit or hydraulic pump) resulting in minimal power loss as compared to conventional power transfer techniques. Moreover, the mechanical linkage does not include a clutch system or disengagement mechanism, hence the mechanical linkage always remains engaged (unless the MPTS is uninstalled). As a result, the secondary power generation system generates power during engine idle when the engine crankshaft is rotating at a low RPM, and also generates power when the engine is operating normally and the engine crankshaft is rotating at a high RPM. Secondary power generation system tends to operate more efficiently and generates a greater amount of electrical energy than is generated using conventional power generation systems.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 is a simplified diagram of the MPTS 100 showing diameters of the pulleys comprised in coupling mechanisms 101 and 103.

FIG. 10 is an equation for determining the angular displacement of generator shaft 110 for a given angular displacement of crankshaft 109.

FIG. 11 is an equation for determining the torque transferred from the engine output shaft 153 to the generator shaft 145.

FIG. 17 is an exploded diagram of bearing housing assembly 138 of FIG. 5.

FIG. 18 is a perspective diagram of the assembled bearing housing assembly 138 of FIG. 5.

FIG. 19 is a cross sectional diagram of bearing housing assembly 138 of FIG. 5.

FIG. 25 is a diagram of another embodiment of a Mechanical Power Transfer System (MPTS) 170 that includes a double pulley in addition to an auxiliary pulley.

FIG. 26 is an equation for calculating an angular displacement of the generator shaft 110 for a given angular displacement of crankshaft 109, using MPTS 170 of FIG. 25.

FIG. 27 is an equation for calculating the torque transferred from crankshaft 109 to the generator shaft 110, using MPTS 170 of FIG. 25.

FIG. 30 is a diagram of yet another embodiment of a Mechanical Power Transfer System (MPTS) 200 using a mechanical coupling for direct coupling to the generator shaft 110.

FIG. 31 is an equation for calculating the angular displacement of the generator shaft 110 for a given angular displacement of crankshaft 109 when MPTS 200 of FIG. 30 is used.

DETAILED DESCRIPTION

Reference will now be made in detail to some embodiments of the invention, examples of which are illustrated in the accompanying drawings.

Figure 1:
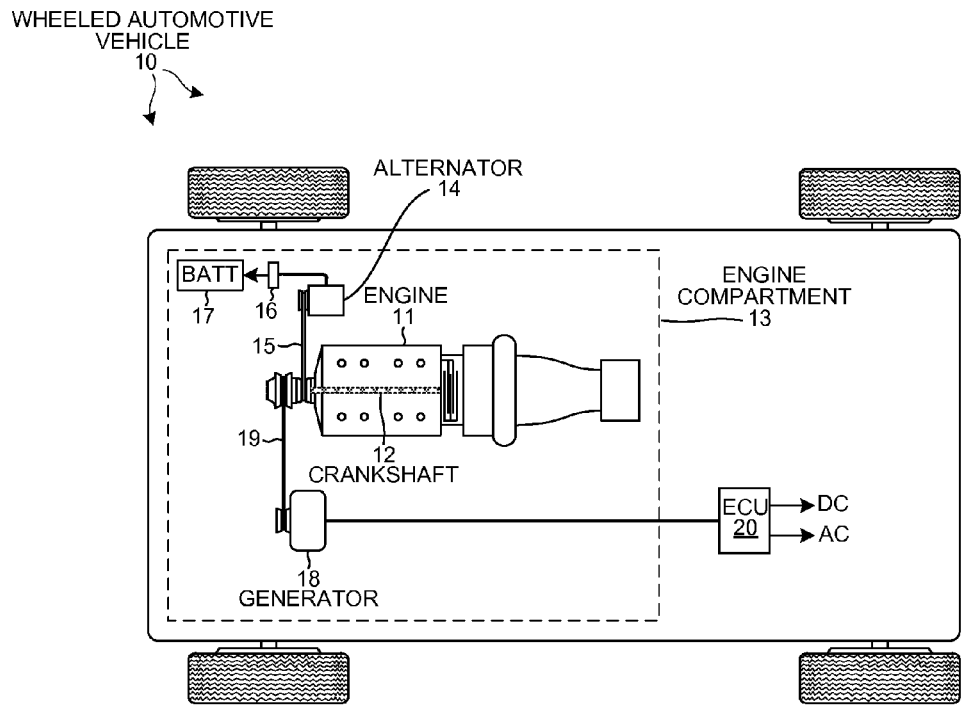
FIG. 1 (Prior Art) is a block diagram of vehicle 10 with a primary and secondary power generation system installed within engine compartment 13.
Figure 2:
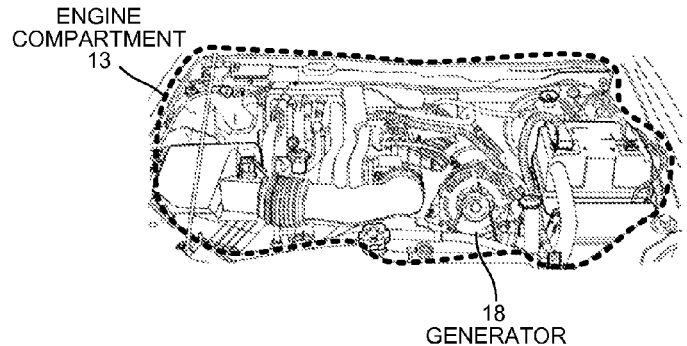
FIG. 2 (Prior Art) is a perspective diagram of engine compartment 13.
Figure 3:
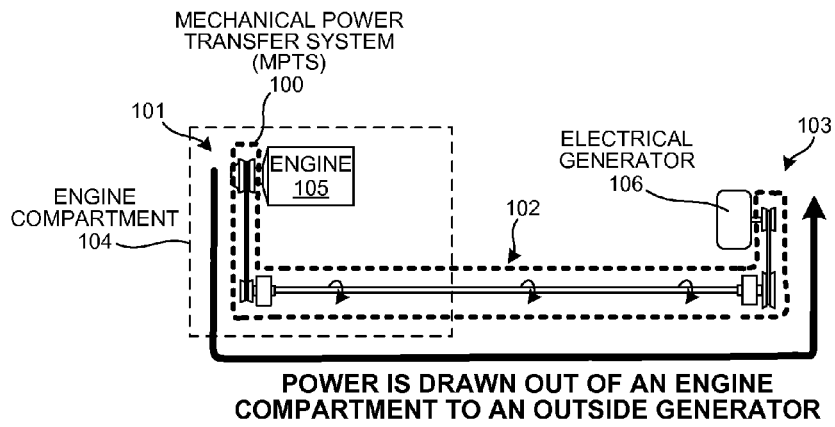
FIG. 3 is a diagram of a Mechanical Power Transfer System (MPTS) 100 that draws power out of an engine compartment, in accordance with one novel aspect.

FIG. 3 is a diagram of a Mechanical Power Transfer System (MPTS) 100 that draws power out of an engine compartment, in accordance with one novel aspect. MPTS 100 comprises a first coupling mechanism 101, a shaft 102, and a second coupling mechanism 103. The first coupling mechanism 101 couples a crankshaft of internal combustion engine 105 to one end of shaft 102, and the second coupling mechanism 103 couples an opposite end of shaft 102 to a shaft of electrical generator 106. In this fashion, mechanical power is drawn out of engine compartment 104 and transferred to electrical generator 106 that is disposed outside of the engine compartment 104. Electrical generator 106 converts the torque output by the engine 105 into electrical power that is supplied and consumed by other components disposed outside of engine compartment 104.

Figure 4:
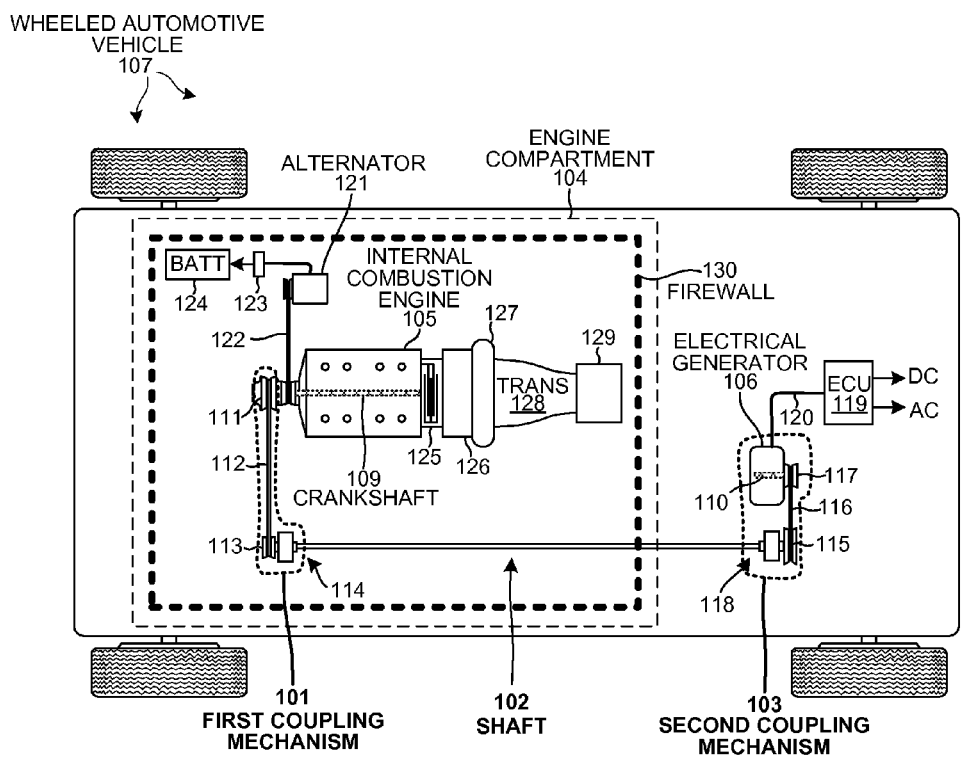
FIG. 4 is a block diagram of a wheeled automotive vehicle 107 retrofitted with the MPTS 100.

FIG. 4 is a diagram of a wheeled automotive vehicle 107 retrofitted with the MPTS 100. A first entity (an owning entity) typically acquires vehicle 107 from a second entity (a manufacturing entity) responsible for manufacturing vehicle 107. The owning entity may decide to retrofit vehicle 107 to include an electrical generator 106 that generates auxiliary electrical power during operation of vehicle 107. Such auxiliary electrical power is used to power other components attached to or that are a part of vehicle 107. The owning entity contracts with a third entity (a retrofitting entity) to retrofit vehicle 107 to support electrical generator 106. If the retrofitting entity were to install an electrical generator within engine compartment 104, then the size of the generator would be limited to the tight space constraints of engine compartment 104. Instead, retrofitting entity attaches electrical generator 106 outside of engine compartment 104 to a portion of a chassis or body of vehicle 107 that is outside of the engine compartment 104. After generator 104 is secured outside engine compartment 104, retrofitting entity installs MPTS 100 to mechanically couple crankshaft 109 to generator shaft 110. By retrofitting vehicle 107 with MPTS 100, crankshaft 109 is able to drive generator shaft 110 that is disposed outside of engine compartment 104.

Installation of MPTS 100 may vary depending upon the type and construction of vehicle 107, however, installation typically begins by opening a vehicle hood or vehicle cab body to gain access to the inside of engine compartment 104. Once the retrofitting entity obtains access to crankshaft 109, retrofitting entity couples crankshaft 109 to shaft 102 using first coupling mechanism 101. In this example, first coupling mechanism 101 comprises a drive pulley 111, a belt 112, and an auxiliary drive pulley 113. Retrofitting entity couples drive pulley 111 to crankshaft 109, and couples auxiliary drive pulley 113 to end 114 of shaft 102. Belt 112 thereby interconnects and operatively couples crankshaft 109 to shaft 102. Retrofitting entity then couples generator shaft 110 to shaft 102 using second coupling mechanism 103. In this example, second coupling mechanism 107 comprises an auxiliary generator pulley 115, a belt 116, and a generator pulley 117. Retrofitting entity couples generator pulley 117 to generator shaft 110, and couples auxiliary generator pulley 115 to end 118 of shaft 102. Belt 116 thereby interconnects and operatively couples generator shaft 110 to shaft 102. When installed in this fashion, MPTS 100 couples crankshaft 109 to generator shaft 110 thereby drawing power out of engine compartment 104 to drive a shaft disposed outside engine compartment 104.

During operation of engine 105, rotational torque on crankshaft 109 is transferred to shaft 102 via first coupling mechanism 101, and the rotational torque is then transferred to generator shaft 110 via second coupling mechanism 103. Rotation of generator shaft 110 produces electrical energy within generator 106. The generated electrical energy is supplied to electrical control unit 119 via conductors 120. Electrical control unit 119 filters and processes the electrical energy, and is used to supply the generated electrical power to various components of vehicle 107 via a plurality of conductors (not shown). In the example of FIG. 4, electrical control unit 119 is programmable to output a Direct Current (DC) voltage signal and a Alternating Current (AC) signal. Thus, electrical control unit 119 is able to supply electrical power to AC devices as well as DC devices. For additional detail on the structure and operation of electrical generator 106, the structure and operation of electrical control unit 119, how electrical generator 110 is electrically coupled to electrical control unit 119, and how electrical control unit 119 is programmed and configured to supply power to various components, see:

1) U.S. Pat. No. 5,898,244, entitled "Dual-Directional Field Coil Actuator", filed May 9, 1997, by Kotsianas et al.; 2) U.S. Pat. No. 6,157,175, entitled "Mobile Power Generation System", filed Feb. 26, 1999, by Morinigo et al.; 3) U.S. Pat. No. 6,700,214, entitled "Mobile Power Generation System", filed Aug. 24, 2001, by Ulinski et al.; and 4) U.S. Pat. No. 6,700,802, entitled "Bi-Directional Power Supply Circuit", filed Aug. 24, 2001, by Ulinski et al. (the subject matter of each of these four patent documents is incorporated herein in its entirety).

In the example of FIG. 4, vehicle 107 includes an alternator 121 coupled to belt system of vehicle 107. The manufacturing entity typically manufactures vehicle 107 with a power system that comprises alternator 121 which is used to draw power from engine 105 via belt 122 and to generate an AC voltage. The AC voltage is converted to a DC voltage by inverter 123 and the DC voltage is supplied to and charges battery 124. Battery 124 is used to power various components of vehicle 107. Due to the limited space constraints of engine compartment 104, alternator 121 tends to be smaller and less robust than electrical generator 106 which vehicle 107 is retrofitted to include. In addition, electrical generator 106 tends to generate more power than alternator 106 because electrical generator 106 is disposed outside of engine compartment 104 in a cooler area of vehicle 107. Moreover, alternator 121 tends to require more maintenance and is subject to more wear than electrical generator 106 because of the harsh conditions existent in the engine compartment 104 during operation of vehicle 107.

Manufacturing entity also manufactures the power train of vehicle 107 that comprises the internal combustion engine 105, a clutch 125, a starter unit 126, a torque converter 127, a transmission 128, and a transfer mechanism unit 129, among other parts not illustrated. A majority of the power train is comprised within engine compartment 104. Engine compartment 104 may include a firewall layer 130 that forms a separation barrier between the engine and vehicle occupants. In this example, engine compartment 104 forms a firewall layer 130 and is integrally formed layer disposed on the engine compartment 104. Such a layer typically protects vehicle occupants from extremely high temperatures that could result if vehicle 107 were involved in an serious collision. Shaft 102 extends through firewall layer 130 and an opening portion of engine compartment 104. In some examples, firewall layer 127 does not entirely enclose engine compartment 104. In yet other examples, the firewall layer is formed on a detachable structure such as a cab body structure (see FIG. 36) that encloses the engine compartment.

Internal combustion engine 105 is coupled to clutch 125, and clutch 125 controls or limits the output power supplied from internal combustion engine 105 to the rest of the drive train. Clutch 125 is coupled to the torque converter 127 which selects an appropriate torque to supply to drive axles of the drive train via the transmission 128. Transmission 128 typically comprises various gears used for operating vehicle 107 in one of several different modes. During typical operation of vehicle 107, transfer mechanism 113 delivers a driving rotation or torque to a front differential (not shown) and a rear differential (not shown) that drive wheels. The above is merely a simplified explanation of how power train of vehicle 107 operates. Vehicle 107 is but one of several types of vehicles that can be retrofitted to include novel MPTS 100. Below is a more detailed explanation of the structure and operation of MPTS 100.

Figure 5:
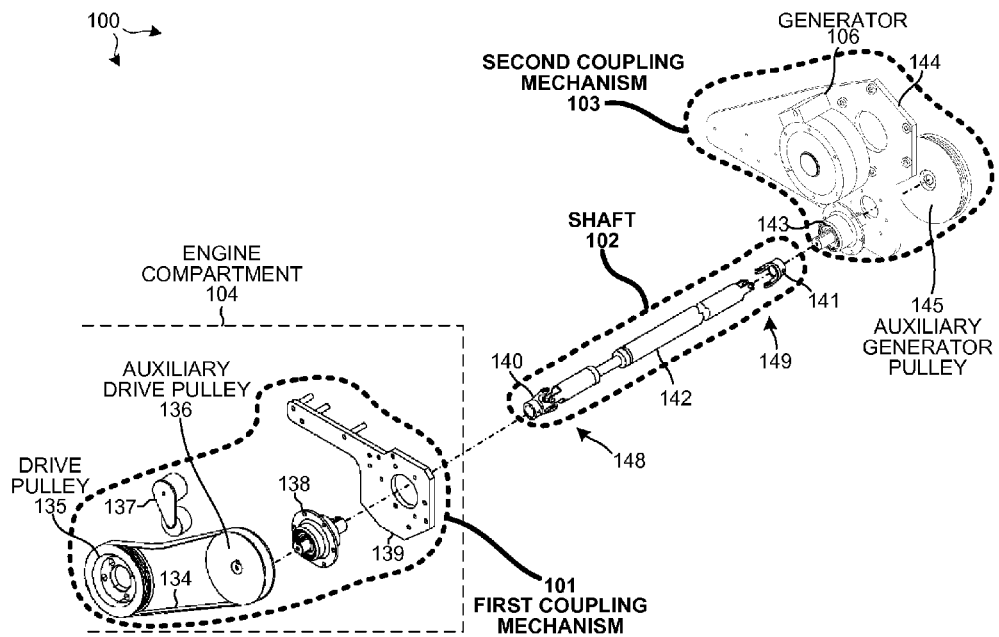
FIG. 5 is an exploded perspective diagram of one embodiment of MPTS 100 illustrating how various components of MPTS 100 are attached.

FIG. 5 is an exploded perspective diagram of one embodiment of MPTS 100 illustrating how various components of MPTS 100 are attached. MPTS 100 includes first coupling mechanism 101, shaft 102, and second coupling mechanism 103. First coupling mechanism 101 includes a belt 134, a drive pulley 135, an auxiliary drive pulley 136, a tensioner unit 137, a bearing housing assembly 138, and a mounting bracket (or support member) 139. Shaft 102 includes yoke units 140 and 141, and a torque tube 142. The second coupling mechanism 103 comprises a bearing housing assembly 143, a support member (or mounting bracket) 144, an auxiliary generator pulley 145, a belt 146 (hidden, but illustrated in FIG. 6), and a generator pulley 147 (also hidden, but illustrated in FIG. 6).

The first coupling mechanism 101 is used to couple crankshaft 109 of engine 105 to shaft 102. Drive pulley 135 is coupled to crankshaft 109 of engine 105, and auxiliary drive pulley 136 is coupled to a first end 148 of the shaft 102 via the bearing housing assembly 138. Belt 134 interconnects drive pulley 135 and auxiliary drive pulley 136 so that a rotation of drive pulley 135 will rotate shaft 102. Tensioner 137 applies tension on belt 134 and tends to decrease slippage of the belt 134 during operation of system 101. Bearing housing assembly 138 secures and supports the auxiliary drive pulley 136 to the mounting bracket 139. Bearing housing assembly 138 includes bearings (shown in FIG. 16) helping to minimize friction during rotation of auxiliary drive pulley 136, as it rotates shaft 102. Mounting bracket 139 secures first coupling mechanism 101 to engine 105. Mounting bracket 139 includes several screw holes for attaching mounting bracket 139 to engine 105, and includes additional screw holes for attaching the tensioner 137 and bearing housing assembly 138 to the mounting bracket 139.

Second coupling mechanism 103 is attached to a portion of the chassis or vehicle body that is disposed outside of engine compartment 104. Second coupling mechanism 103 couples generator 106 to shaft 102. Generator pulley 147 is attached to generator shaft 110 (hidden from view, but illustrated in FIG. 6), and auxiliary generator pulley 145 attaches to a second end 149 of shaft 102 via the bearing housing assembly 143. Belt 146 interconnects generator pulley 147 and auxiliary generator pulley 145 so that a rotation of shaft 102 will rotate generator shaft 110. Bearing housing assembly 143 secures and supports the auxiliary generator pulley 145 to the mounting bracket 144. Bearing housing assembly 143 includes bearings that help minimize friction during rotation of auxiliary generator pulley 145, as it rotates along with shaft 102. Mounting bracket 144 secures the second coupling device 103 and generator 110 to a portion of the chassis or vehicle body that is disposed outside of the engine compartment 104. Mounting bracket 144 includes several screw hole portions for supporting bearing housing assembly 143.

Shaft 102 mechanically couples first coupling mechanism 101 to second coupling mechanism 103. First end 148 of shaft 102 attaches to a center of auxiliary drive pulley 136, and second end 149 of shaft 102 attaches to a center of auxiliary generator pulley 145, so that both pulleys 136 and 145 rotate in unison. In order to increase efficiency of power transfer between coupling mechanisms 101 and 102, shaft 102 is aligned to form a straight, linear path between the centers of auxiliary pulleys 136 and 145. However, it is often difficult to attach both auxiliary pulleys 136 and 145 at each of their respective center. It is also difficult to maintain the straight, linear path that extends between each of the auxiliary pulleys 136 and 145, especially during operation of vehicle 107 when MPTS 100 is subject to vibrations. When vehicle 107 is in motion, misalignment can occur such that shaft 102 no longer forms this straight path. Yokes 140 and 141 are constructed and installed in order to minimize the effects of such misalignment that can arise. Yoke 140 attaches end 148 of shaft 102 the bearing housing assembly 138, and yoke 141 attaches end 149 of shaft 102 to bearing housing assembly 143. Torque tube 142 is typically constructed so that it is hollow inside resulting in a structurally stronger shaft. Such hollow construction of torque tube 142 allows shaft 102 to be built with a greater diameter without utilizing extra materials that would be needed if shaft 102 were to be constructed in a completely solid fashion. Generally, it is desirable for shaft 102 to have a large diameter because a large diameter increases the moment of inertia of shaft 102 resulting in decreased overall stress on shaft 102 during operation of vehicle 107.

Figure 6:
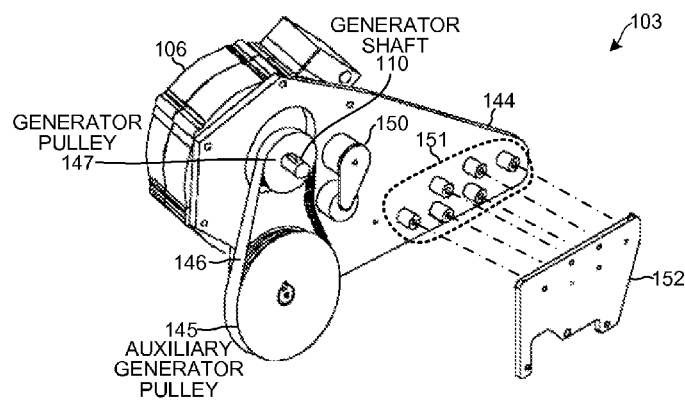
FIG. 6 is a perspective diagram showing how the second coupling mechanism 103 couples to the generator shaft 110.

FIG. 6 is a perspective diagram showing how the second coupling mechanism 103 couples to the generator shaft 110. Mounting bracket 144 supports generator 106, auxiliary generator pulley 145 and tensioner 150. Tensioner 150 applies tension on belt 146 tending to decrease slippage of belt 146 during operation of vehicle 107. A screw hole portion 151 of the mounting bracket 144 attaches to a surface of the vehicle 107 that is outside the engine compartment 104, such as a portion of the chassis (a side rail portion or a vertical crossmember portion) of a portion of the vehicle body. Auxiliary mounting plate 152 provides further structural support in securing the second coupling mechanism 103 to vehicle 107.

Figure 7:
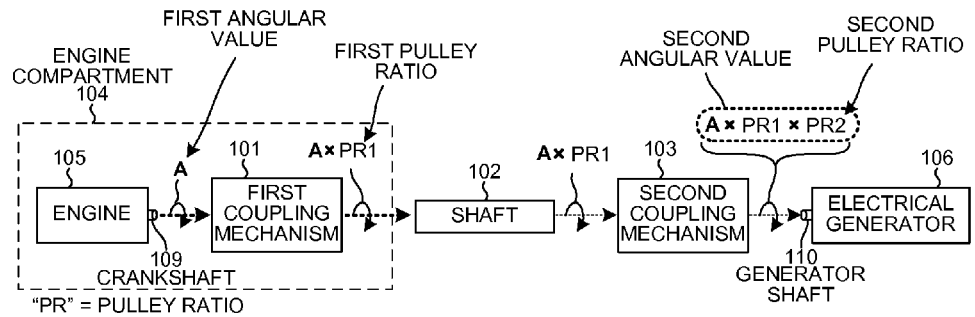
FIG. 7 is a diagram showing how an angular displacement of crankshaft 109 induces an angular displacement of the generator shaft 110.

FIG. 7 is a diagram showing how an angular displacement of crankshaft 109 induces an angular displacement of the generator shaft 110. An angular displacement (or rotation) of crankshaft 109 is indicated by the label "A" and is measured in units of degrees or radians. The coupling mechanisms 101 and 103 each have a pulley ratio of "PR1" and "PR2", respectively. The pulley ratios determine, in part, the degree to which generator shaft 110 rotates upon a rotation of crankshaft 109. For example, if crankshaft 109 rotates by angle "A", then the first coupling mechanism 101 having a first pulley ratio ("PR1"), rotates shaft 102 by an angle of "A×PR1". This then causes second coupling mechanism 103 having a second pulley ratio ("PR2") to rotate generator shaft 110 by an angle of "A×PR1×PR2". The pulley ratios represent a ratio of diameters of the pulleys in each of the coupling mechanisms 101 and 103, and determine how angular displacement, torque, and speed are transferred from the crankshaft 109 to the generator shaft 110 through MPTS 100. The pulley ratios are selected by the retrofitting entity prior to construction of MPTS 100. The pulley ratios are selected according to operational speed ratings of engine 105 and electrical generator 106 as set forth below.

Figure 8:
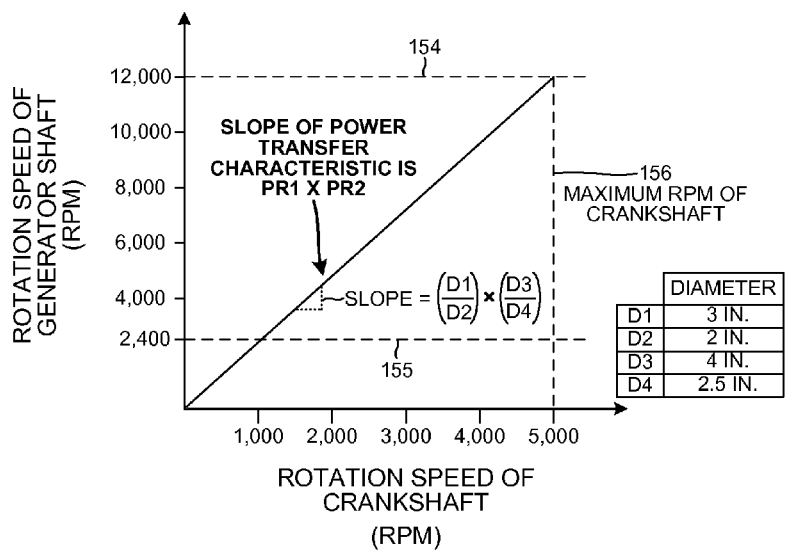
FIG. 8 is a graph of rotational speed of generator shaft 110 as a function of rotational speed of crankshaft 109.

FIG. 8 is a graph of rotational speed of generator shaft 110 as a function of rotational speed of crankshaft 109. The rotational speed of generator shaft 110 is a function of the pulley ratios of the first and second coupling mechanisms 101 and 103. In this example, crankshaft 109 of engine 105 rotates at a maximum rate of 5,000 Rotations Per Minute (RPM) (identified by dashed line 156). The pulley ratios ("PR1" and "PR2") must be selected such that the rotation speed of generator shaft 110 is maintained within an acceptable rotational speed range. The upper bound 154 represents the maximum RPM that generator shaft 110 can operate without damaging generator 106. In this example, generator 106 can operate when generator shaft 110 is rotating at a maximum of 12,000 RPM. If the RPM of generator shaft 110 were to exceed 12,000 RPM, then generator 106 could be damaged and rendered inoperable. Thus, pulley ratios "PR1" and "PR2" must be selected such that when engine 105 is operating at its maximum RPM 152 (5,000 RPM), the rotational speed of generator shaft 110 does not exceed 12,000 RPM. On the other hand, the lower bound 155 represents the minimum RPM of generator shaft 110 required in order for generator 106 to operate properly and still generate electrical energy.

Here, ideal operation of generator 106 requires that the rotational speed of generator shaft 110 does not fall below the lower bound 155 of 2,400 RPM, even when the engine 102 is in an idle state and is operating at a low RPM, for example, 1,000 RPM. Thus, pulley ratios "PR1" and "PR2" are selected such that when engine 105 is operating in an idle state (1,000 RPM), generator shaft 110 remains rotating at above 2,400 RPM (1,000×12/5=2,400 RPM).

FIG. 9 is a simplified diagram of the MPTS 100 showing diameters of the pulleys of coupling mechanisms 101 and 103. Drive pulley 135 has a diameter of "D1", auxiliary drive pulley 136 has a diameter of "D2", auxiliary generator pulley 145 has a diameter of "D3", and generator pulley 147 has a diameter of "D4". These diameters determine the pulley ratios, "PR1" and "PR2", of first and second coupling mechanisms 101 and 103, respectively. If crankshaft 109 is driven to rotate by an angular value of "A_DRIVE", then generator shaft 110 rotates by an angular value of "A_GEN". Similarly, if a torque of "T_DRIVE" is present on crankshaft 109, then a torque of "T_GEN" is present on generator shaft 110. Equations for calculating "A_GEN" and "T_GEN" are provided in FIGS. 10 and 11.

The pulley ratios of first and second coupling mechanism 101 and 103 determine how angular displacement, rotational speed, and torque are transferred from crankshaft 109 to generator shaft 110. In the above example, drive pulley 135 has a diameter of 3 inches ("D1"=3 inches) and auxiliary drive pulley 136 has a diameter of 2 inches ("D2"=2 inches), resulting in first coupling mechanism 101 having a pulley ratio of 3/2 ("PR1"=3/2). Auxiliary generator pulley 145 has a diameter of 4 inches ("D3"=4 inches) and generator pulley 147 has a diameter of 2.5 inches ("D4"=2.5 inches), resulting in second coupling mechanism 103 having a pulley ratio of 4/2.5 ("PR2"=4/2.5). MPTS 100 selected with the above pulley ratios results in generator shaft 110 rotating below the upper bound of 12,000 RPM when crankshaft 109 is rotating at a maximum of 5,000 RPM (5,000 RPM×12/5=12,000 RPM) (identified by dashed line 154). On the other hand, generator shaft 110 remains above the lower bound of 2,400 RPM when crankshaft 109 is rotating at a minimum of 1,000 RPM (1,000 RPM×12/5=2,400 RPM) (identified by dashed line 155).

FIG. 10 is an equation for determining the angular displacement of generator shaft 110 for a given angular displacement of crankshaft 109. The pulley ratios "PR1" and "PR2" are determined from the diameters of pulleys comprised in the first and second coupling mechanism 101 and 103, respectively. Here, "PR1" is equivalent to "D1" divided by "D2", and "PR2" is equivalent to "D3" divided by "D4". FIG. 11 is an equation for determining the torque transferred from the engine output shaft 153 to the generator shaft 145.

Figure 12:
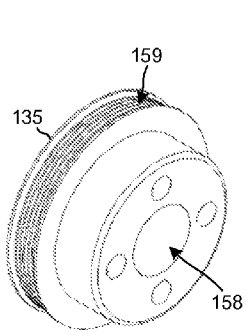
FIGS. 12-14 are perspective diagrams of the drive pulley 135 of FIG. 5.
Figure 13:
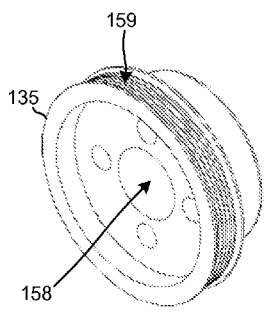
Figure 14:
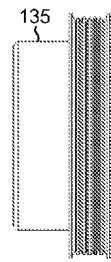
Figure 15:
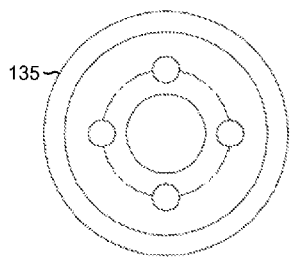
FIGS. 15-16 are cross-sectional diagrams of drive pulley 135.
Figure 16:
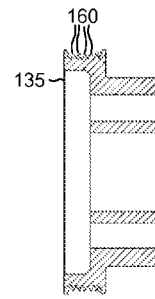

FIGS. 12-14 are perspective diagrams of the drive pulley 135 of FIG. 5. Drive pulley 135 is coupled to crankshaft 109 through retaining portion 158. Belt 134 is wound around ridge portion 159 such that rotation of drive pulley 135 rotates auxiliary drive pulley 136. FIGS. 15-16 are cross-sectional diagrams of drive pulley 135. Ridge portion 159 includes a plurality of ridges 160 that support and maintain the belt 134 wound around drive pulley 135 and help prevent belt 134 from slipping.

FIG. 17 is an exploded diagram of bearing housing assembly 138 of FIG. 5. Bearing housing assembly 138 comprises an internal retaining ring 161, a first radial bearing 162, an outer spacing 163, an inner spacing 164, a second radial bearing 165, a straight coupler shaft 166, a wave washer 167, and a bearing housing 168. The bearing housing assembly 143 of the second coupling mechanism 103 is of substantially the same structure and construction as the illustrated bearing housing assembly. FIG. 18 is a perspective diagram of the assembled bearing housing assembly 138 of FIG. 5. FIG. 19 is a cross sectional diagram of bearing housing assembly 138 of FIG. 5.

Figure 20:
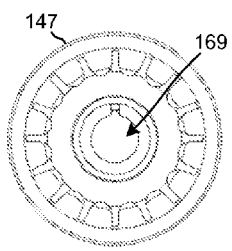
FIGS. 20-22 are perspective diagrams of generator pulley 147 of first coupling mechanism 101.
Figure 21:
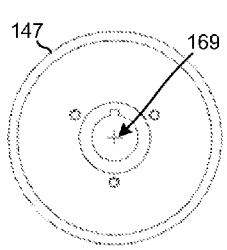
Figure 22:
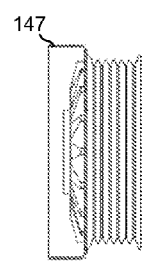
Figure 23:
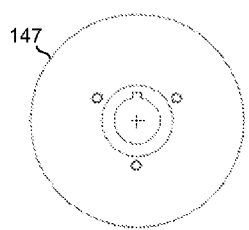
FIGS. 23-24 are cross-sectional diagrams of generator pulley 147 of the first coupling mechanism 101.
Figure 24:
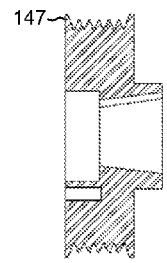

FIGS. 20-22 are perspective diagrams of generator pulley 147 of first coupling mechanism 101. Generator shaft 110 is secured in retaining portion 169 of generator pulley 147. FIGS. 23-24 are cross-sectional diagrams of generator pulley 147 of the first coupling mechanism 101.

FIG. 25 is a diagram of another embodiment of a Mechanical Power Transfer System (MPTS) 170 that includes a double pulley in addition to an auxiliary pulley. Transfer system 170 comprises a first coupling mechanism 171, a shaft 172, and a second coupling mechanism 173. The first coupling mechanism 171 includes a drive pulley 174, an auxiliary drive double pulley 175, an auxiliary drive pulley 176, and belts 177 and 178. Second coupling mechanism 173 includes auxiliary generator pulley 179, generator pulley 180, and belt 181. MPTS 170 operates substantially similar to how MPTS 100 of FIG. 9 functions, except that the first pulley ratio "PR1" is different because auxiliary drive double pulley 175 has two diameters, "D2" and "D3". By using the auxiliary drive double pulley 175, the pulley ratio of the first coupling mechanism 171 ("PR1") is dependent upon four diameters instead of two diameters as in the example of FIG. 9.

FIG. 26 is an equation for calculating an angular displacement of the generator shaft 110 for a given angular displacement of crankshaft 109, using MPTS 170 of FIG. 25. The pulley ratio "PR1" of the first coupling mechanism 171 includes another factor to account for the two diameters of the double pulley, as shown in the equation. Double pulley 175 can provide finer tuning of the pulley ratio of the first coupling device ("PR1") depending on the pulley ratio requirements. FIG. 27 is an equation for calculating the torque transferred from crankshaft 109 to the generator shaft 110, using MPTS 170 of FIG. 25.

Figure 28:
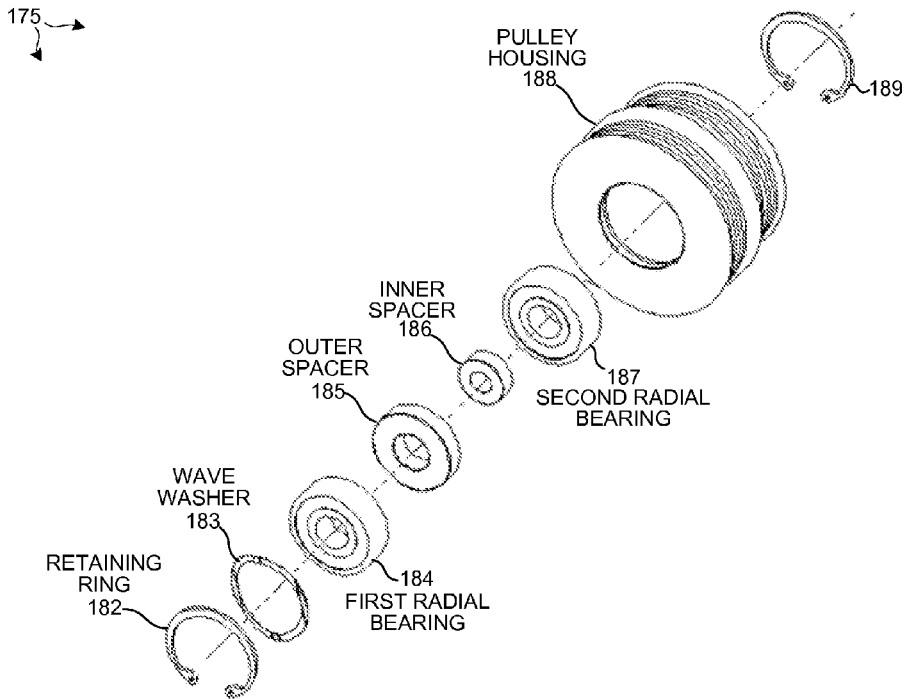
FIG. 28 is a diagram of an exploded view of double pulley 175 of first coupling device 171 of FIG. 25.
Figure 29:
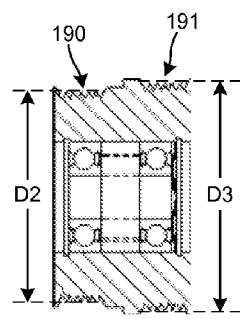
FIG. 29 is a diagram of a cross-sectional view of double pulley 175. Double pulley 175 has two diameters, "D2" and "D3".

FIG. 28 is a diagram of an exploded view of double pulley 175 of first coupling device 171 of FIG. 25. Double pulley 175 comprises a retaining ring 182, a wave washer 183, a first radial bearing 184, an outer spacer 185, an inner spacer 186, a second radial bearing 187, a pulley housing 188, and another retaining ring 189. FIG. 29 is a diagram of a cross-sectional view of double pulley 175. Double pulley 175 has two diameters, "D2" and "D3". Belt 177 rests along ridge portion 190 forming diameter "D2" and belt 178 rests along ridge portion 191 forming diameter "D3", as illustrated in FIG. 25.

FIG. 30 is a diagram of yet another embodiment of a Mechanical Power Transfer System (MPTS) 200 using a mechanical coupling for direct coupling to the generator shaft 110. MPTS 200 comprises a first coupling device 201, a shaft 202, and a second coupling device 203. The first coupling mechanism 201 includes a drive pulley 204, an auxiliary drive pulley 205, and a belt 206. Second coupling device 203 comprises a mechanical coupling 207 and does not involve any belts or pulleys. One advantage of MPTS 200 is that it utilizes fewer components and simplifies installation in a vehicle.

FIG. 31 is an equation for calculating the angular displacement of the generator shaft 110 for a given angular displacement of crankshaft 109 when the MPTS 200 of FIG. 30 is used. The pulley ratio of second coupling mechanism 203 is unity ("PR2"=1), because it has no pulleys and so generator shaft 110 rotates in unison with shaft 102. Therefore, the pulley ratio of the first coupling mechanism 201 ("PR1") determines how power is transferred from the crankshaft 109 to the generator shaft 110. FIG. 32 is an equation for calculating the torque transferred from crankshaft 109 to generator shaft 110 using the MPTS 200 of FIG. 30.

Figure 33:
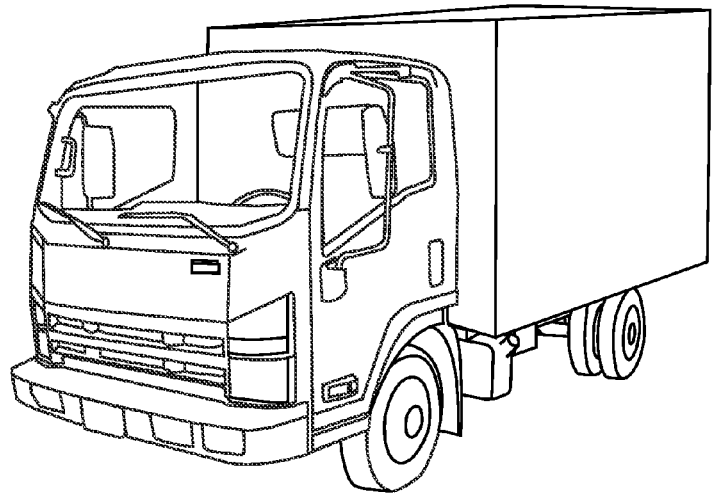
FIG. 33 is a perspective diagram of a wheeled automotive vehicle retrofitted to include a secondary power generation system, in accordance with one novel aspect.
Figure 41:
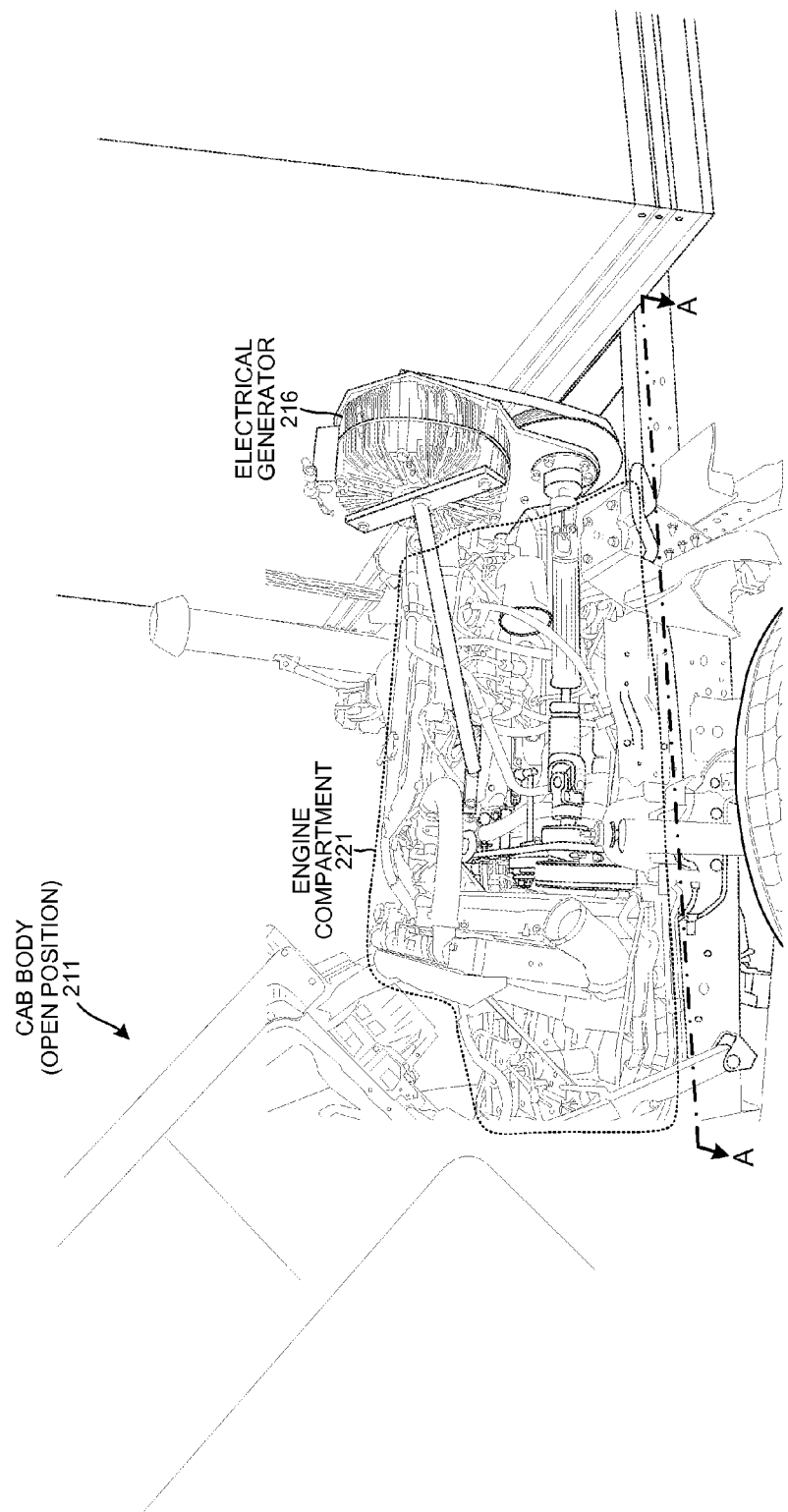
FIGS. 41 and 42 are detailed perspective diagrams showing engine compartment 220 after vehicle 210 is retrofitted with secondary power generation system 215.
Figure 42:
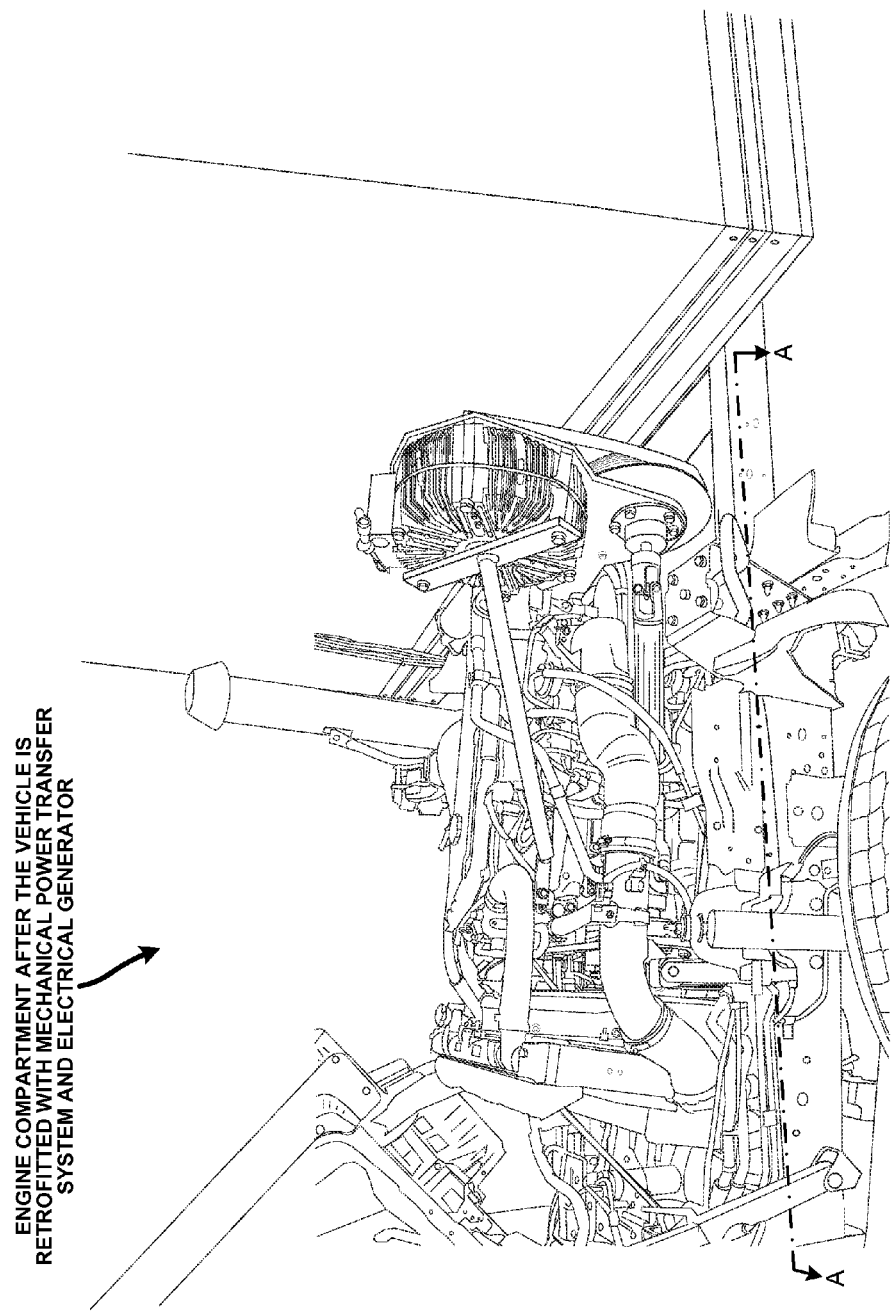

FIG. 33 is a perspective diagram of a wheeled automotive vehicle retrofitted to include a secondary power generation system, in accordance with one novel aspect. The secondary power generation system includes an electrical generator and a Mechanical Power Transfer System (MPTS). Wheeled automotive vehicle 210 is a commercial truck wheeled automotive vehicle, and is but one type of several types of wheeled automotive vehicles that can be retrofitted with the novel MPTS to drive a generator shaft disposed outside of the engine compartment. In the example of FIG. 33, an owning entity acquires vehicle 210 from a manufacturing entity. Typically, the manufacturing entity supplies vehicle 210 to the owning entity with a primary power generation system installed, such as an alternator. The alternator draws power from an internal combustion engine via a crankshaft of vehicle 210, and the alternator generates electrical energy used for charging a battery of vehicle 210. Owning entity decides to equip vehicle 210 with a secondary power generation system for generating auxiliary power that can be supplied to other devices on vehicle 210. Owning entity provides vehicle 210 to a retrofitting entity, and retrofitting entity retrofits vehicle 210 to include the secondary power generation system as shown in FIGS. 41 and 42.

Figure 34:
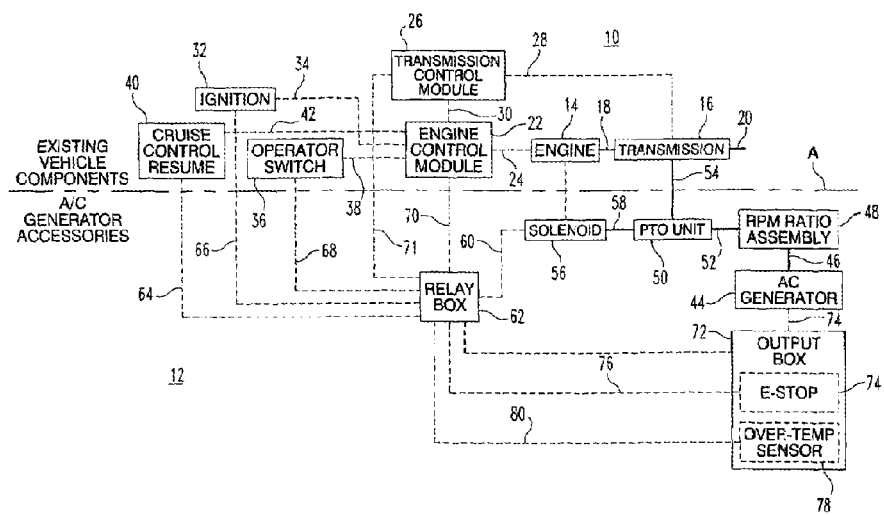
FIG. 34 is a block diagram of a conventional system for transferring power out of an engine compartment.

FIG. 34 is a block diagram of a conventional system for transferring power from an engine of a vehicle to a generator disposed outside an engine compartment of the vehicle. A PTO unit 50 draws power from transmission 16 in order to drive AC generator 44. PTO unit 50 can be engaged and disengaged through solenoid 56 by a mechanical connection 58. RPM ratio assembly 48 controls mechanical power input 46 to rotate at a selected RPM. Whether or not unit 50 is engaged is dependent upon pre-defined conditions. There are several disadvantages with using the conventional PTO unit such as PTO unit 50 (or another intermediary device such as a hydraulic pump) for transferring power out of an engine compartment. Such intermediary devices typically involve inefficient transfer of mechanical power that results in a loss of energy and a decrease in the overall electrical power that is generated by the electrical generator. Moreover, such intermediary devices are costly and tend to be expensive to install and maintain due to their complexity. For additional information on the structure, operation and installation of intermediary devices conventionally used to transfer power such as PTO units and hydraulic pumps, see: U.S. Pat. No. 7,057,303, entitled "Vehicle Mounted Electrical Generator System", filed on Oct. 31, 2005, by Storm et al. (the subject matter of this patent document is incorporated herein in its entirety). By retrofitting vehicle 210 to include the MPTS and the electrical generator, higher efficiency and lower installation cost is obtained as compared to the results achieved with the conventional techniques. Details on retrofitting vehicle 210 with the electrical generator and MPTS are presented below.

Figure 35:
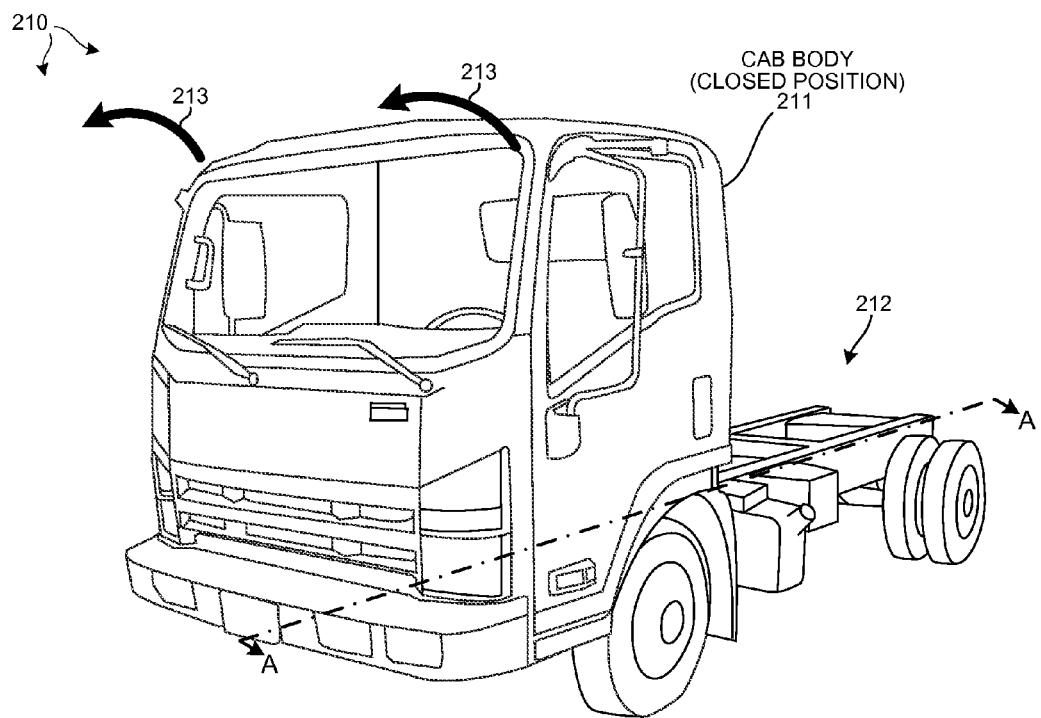
FIG. 35 is a perspective diagram of vehicle 210 identifying cab body 211 and chassis 212.
Figure 36:
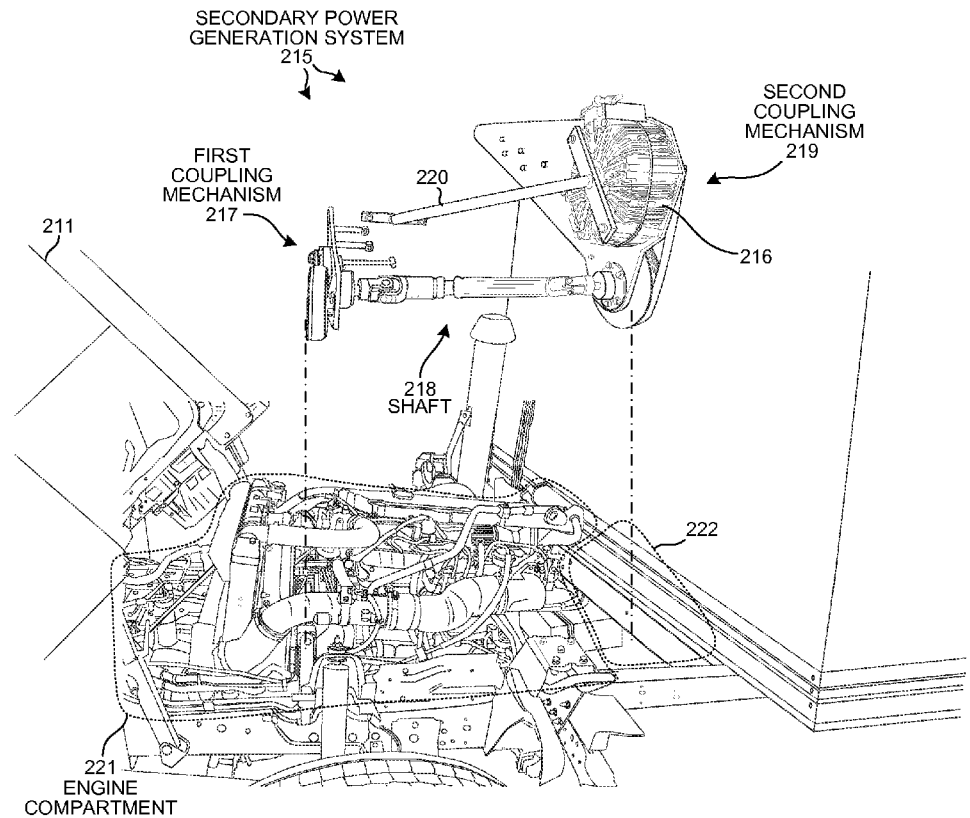
FIG. 36 is a perspective diagram that shows how vehicle 210 is retrofitted with the secondary power generation system 215.

FIG. 35 is a perspective diagram of vehicle 210 that shows cab body 211 and chassis 212. Cab body 211 is shown in a closed position in FIG. 35, but is rotatable to an open position along a path identified with labeled arrows 213. When cab body 211 is rotated into the open position, an engine compartment of vehicle 210 is exposed. The engine compartment is not shown in FIG. 35 because cab body 211 is in the closed position. A detailed diagram of the engine compartment is shown in FIG. 36. Cab body 211 forms a passenger structure for supporting vehicle occupants, and cab body 211 also forms an enclosure structure that is part of the engine compartment. The enclosure structure of cab body 211 comprises a firewall layer. The firewall layer serves as a protective shield between the vehicle occupants and the engine of vehicle 210. In this embodiment, retrofitting entity begins retrofitting by rotatably engaging cab body 211 into the open position thereby exposing part of the engine compartment and a portion of the power train of vehicle 210.

FIG. 36 is a perspective diagram showing how vehicle 210 is retrofitted with the secondary power generation system 215. The secondary power generation system 215 comprises a MPTS and an electrical generator 216. The MPTS comprises a first coupling mechanism 217, a shaft 218, and a second coupling mechanism 219. The MPTS is of substantially similar structure to MPTS 100 of FIG. 5, except the MPTS of FIG. 36 further comprises a brace 220 for providing extra support for securing generator 216 to vehicle 210. After retrofitting entity opens cab body 211, retrofitting entity attaches first coupling mechanism 216 to the engine of vehicle 210 such that first coupling mechanism 216 is disposed within engine compartment 220. A crankshaft (not shown) of the engine is coupled to first coupling mechanism 216. Retrofitting entity then attaches second coupling mechanism 218 to a crossmember of chassis 212. Dashed area 222 identifies where on vehicle 210 the electrical generator 216 and the second coupling mechanism 218 is to be attached. Attachment portion 222 is outside of engine compartment 220. After attaching second coupling mechanism 219 to the crossmember of chassis 212, retrofitting entity attaches electrical generator 216 to the second coupling mechanism 219. Once both coupling mechanisms 217 and 219 are attached to their respective portions along vehicle 210, retrofitting entity couples coupling mechanisms 217 and 219 together using shaft 217. By retrofitting vehicle 210 in this fashion, generator 216 is disposed outside of engine compartment 221 and generator 216 uses mechanical power drawn from the engine via the transfer system to generate electrical energy.

Figure 37:
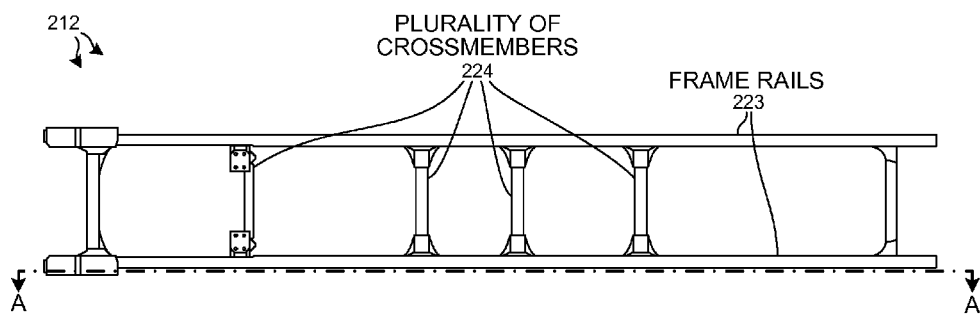
FIG. 37 is a top-view diagram of chassis 212. Chassis 212 comprises a pair of frame rails 223, and a plurality of cross-members 224.

FIG. 37 is a top-view diagram of chassis 212. Chassis 212 comprises a pair of frame rails 223, and a plurality of crossmembers 224. Retrofitting entity selects a attachment portion along vehicle 210 onto which second coupling mechanism 219 is to be attached. The determination of where to attach second coupling mechanism 219 involves determining a stable and secure point along vehicle 210, and such a point is largely dependent upon the manufacture and type of the vehicle to be retrofitted. In this example, retrofitting entity decides to attach second coupling mechanism 219 to one of the plurality of crossmembers 214. Alternatively, retrofitting entity may instead attach the second coupling mechanism 219 to one of the two frame rails 223. In yet other embodiments, retrofitting entity may decide to not attach the second coupling mechanism to the vehicle chassis and instead may decide to attach the second coupling mechanism to a body portion of the vehicle (such as a cab body or cargo body). The retrofitting entity may choose to install the second coupling mechanism to a portion of the vehicle body because the structure of the vehicle to be retrofitted may not allow the retrofitting entity to attach the second coupling mechanism to the chassis without making costly modifications to the vehicle.

Figure 38:
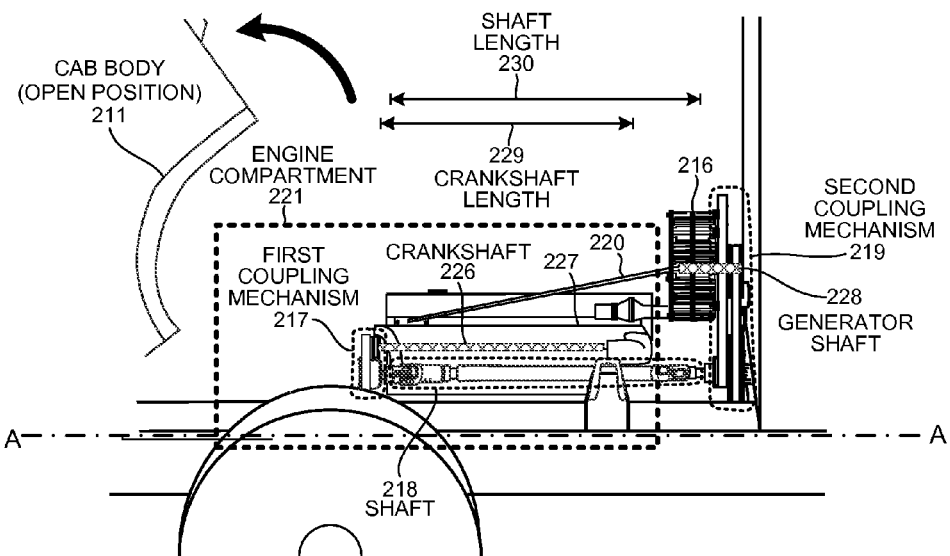
FIG. 38 is a side-view diagram of engine compartment 221 after vehicle 210 is retrofitted with the secondary power generation system 215.

FIG. 38 is a side-view diagram of engine compartment 221 after vehicle 210 is retrofitted with the secondary power generation system. First coupling mechanism 217 is disposed within the engine compartment 221 and is coupled to crankshaft 226 of engine 227. First coupling mechanism 217 is coupled to shaft 218, and shaft 218 extends out of the engine compartment and is coupled to the second coupling mechanism 219. The second coupling mechanism 219 is coupled to generator shaft 228 of the electrical generator 216. First coupling mechanism 217, shaft 218 and second coupling mechanism 219 form a mechanical linkage that extends from crankshaft 226 within the engine compartment 221 to generator shaft 228 disposed outside of engine compartment 220. In order for vehicle 210 to be retrofitted such that electrical generator 216 is disposed outside of engine compartment 220, shaft 218 must extend a first distance 229 extending along a first axis (corresponding to a length of shaft 218) that is greater than a second distance 230 extending along a second axis (corresponding to a length of crankshaft 226). The first axis is substantially parallel to the second axis. As shown in FIG. 38, crankshaft 226 is substantially parallel to shaft 218. Due to the typical structure and dimensions of vehicles likely to require retrofitting, the shaft length 230 is typically greater than 1 foot.

Figure 39:
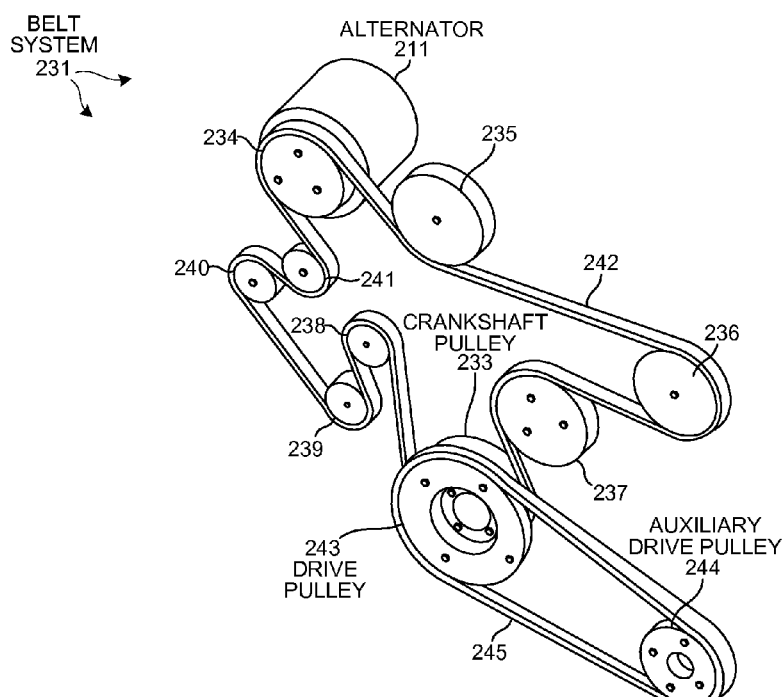
FIG. 39 is a diagram of belt system 231 of vehicle 210 after vehicle 210 is retrofitted with secondary power generation system 215.
Figure 40:
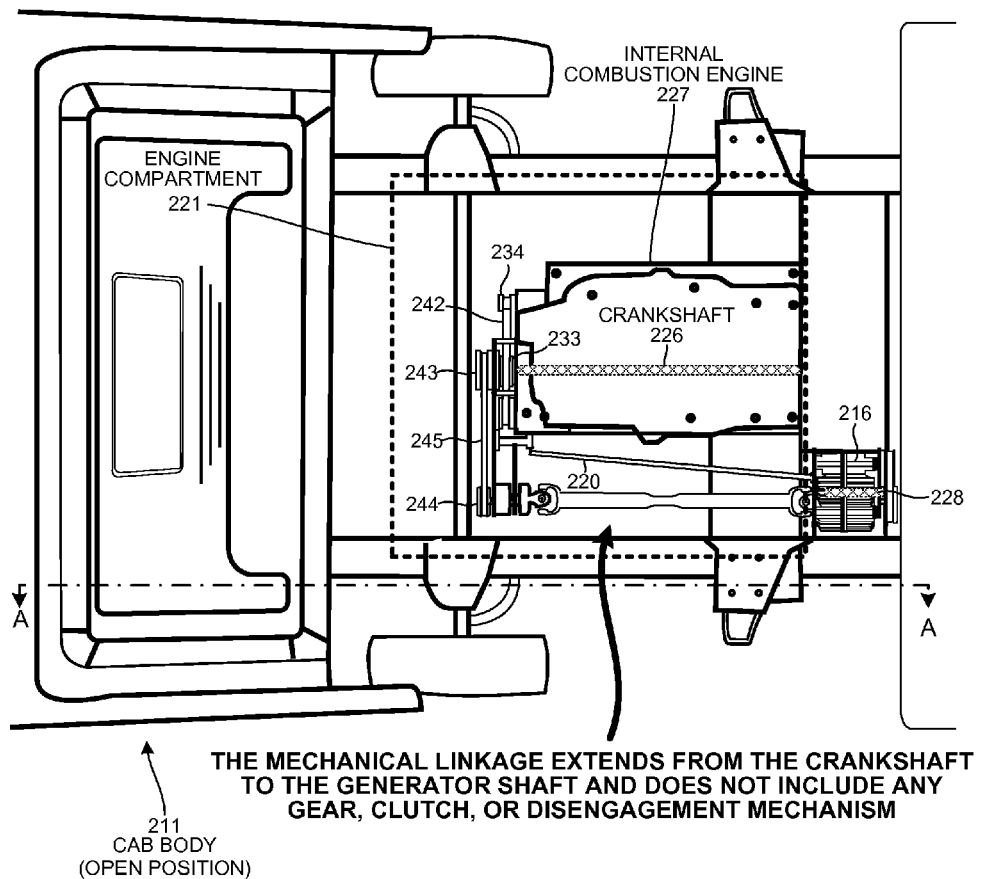
FIG. 40 is a top-view diagram of engine compartment 221 after vehicle 210 is retrofitted with secondary power generation system 215.

FIG. 39 is a diagram of belt system 231 of vehicle 210 after vehicle 210 is retrofitted with secondary power generation system 215. Prior to retrofitting, belt system 231 typically includes crankshaft pulley 233, alternator pulley 234, pulleys 235-241, and belt 242. Crankshaft pulley 233 is coupled directly to crankshaft 226 (as shown in FIG. 40). A primary power generation system of vehicle 210 includes an alternator 211 that draws mechanical power from crankshaft pulley 233 via belt 242. Vehicle 210 is retrofitted so that belt system 231 further includes drive pulley 243, auxiliary drive pulley 244 and belt 245. Drive pulley 243 is coupled directly to crankshaft pulley 233 and to crankshaft 226, and auxiliary drive pulley 244 is coupled to an end of shaft 218 as shown in FIG. 38. Drive pulley 243, auxiliary drive pulley 244 and belt 245 are part of first coupling mechanism 217 as shown in FIG. 36. By retrofitting vehicle 210 in this manner, the MPTS draws power from crankshaft 226 and transfers the mechanical power onto generator shaft 228 which causes generator 216 to generate electrical power. During operation of vehicle 210, rotation of (or torque present on) crankshaft 226 is transferred to the first coupling mechanism 217 via drive pulley 243, onto shaft 218 via auxiliary drive pulley 244, onto second coupling mechanism 219, and onto generator shaft 228. After retrofitting vehicle 210, belt system 231 drives the primary power generation system provided by the manufacturing entity, and belt system 231 also drives the secondary power generation system installed by the retrofitting entity.

FIG. 40 is a top-view diagram of engine compartment 221 after vehicle 210 is retrofitted with secondary power generation system 215. MPTS forms a mechanical linkage between crankshaft 226 and generator shaft 228. The mechanical linkage does not comprise a Power Take-Off (PTO) mechanism, a hydraulic pump mechanism, or any other similar type of intermediary device. Because secondary power generation system 215 does not include a PTO mechanism, system 215 operates more efficiently and tends to generate more electrical power than the conventional system of FIG. 34. Moreover, the mechanical linkage does not include a clutch mechanism or a disengagement mechanism, as is utilized in the conventional techniques of FIG. 34. As a result of lacking a clutch or disengagement mechanism, mechanical linkage is always maintained after vehicle 210 is retrofitted with the secondary power generation system 215. Throughout operation of vehicle 210, crankshaft 226 will engage generator shaft 228 regardless of the operating RPM of crankshaft 226. As shown in FIG. 8, pulley ratios of the MPTS are selected by retrofitting entity such that electrical generator 216 generates electrical energy during minimum and maximum rotational RPMs of crankshaft 226. As explained above, the determination of pulley ratios is based upon the operating characteristics of the engine 227 and electrical generator 216.

FIGS. 41 and 42 are detailed perspective diagrams showing engine compartment 220 after vehicle 210 is retrofitted with secondary power generation system 215. After vehicle 210 is retrofitted, owning entity 210 may configure an electrical control unit to receive electrical energy generated by generator 216 and to distribute electrical power to devices present on vehicle 210.

Figure 43:
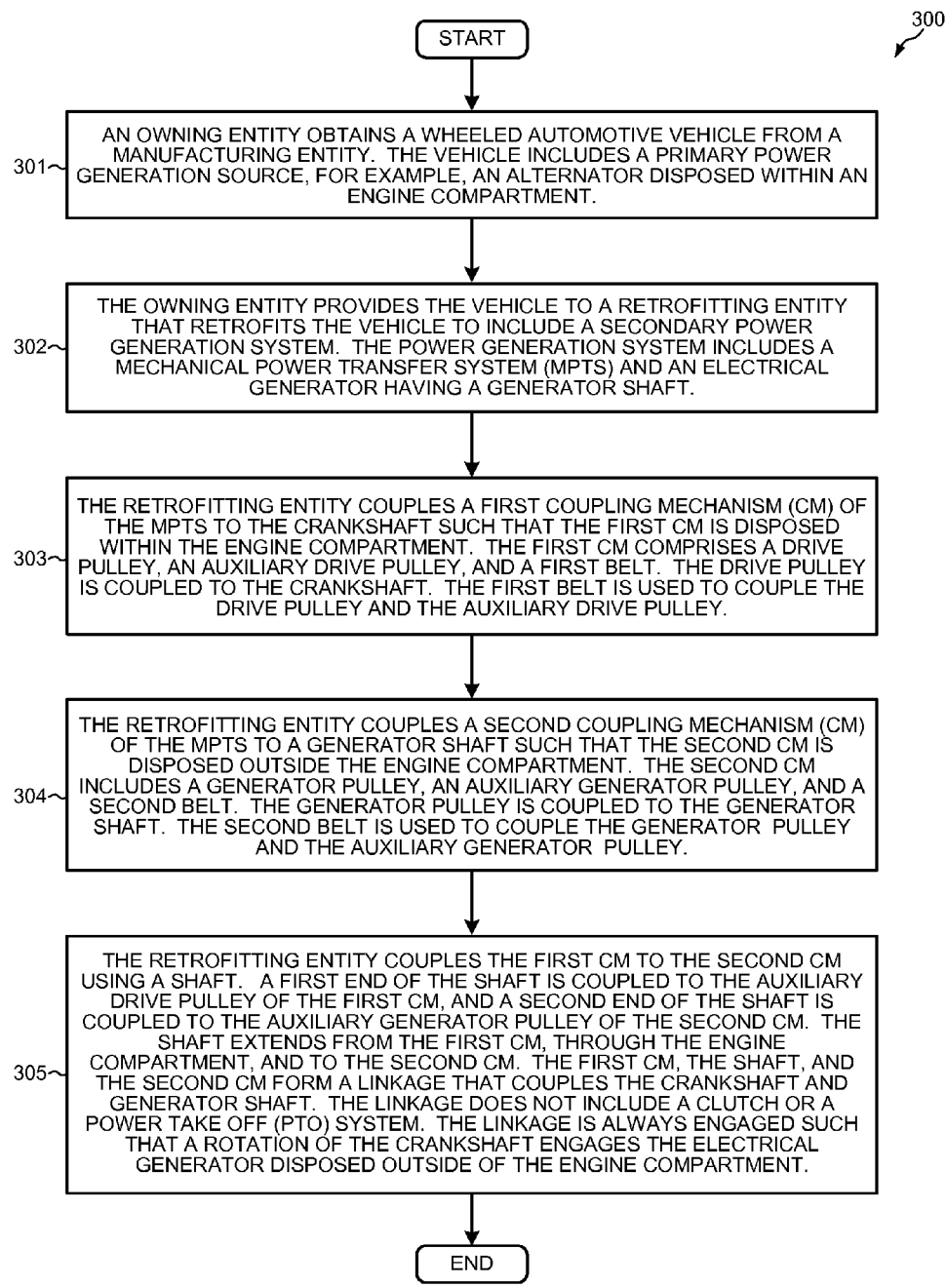
FIG. 43 is a flowchart of a method 300 in accordance with one novel aspect.

FIG. 43 is a flowchart of a method 300 in accordance with one novel aspect. In a first step (step 301), an owning entity obtains a wheeled automotive vehicle from a manufacturing entity. The wheeled automotive vehicle includes a primary power generation source. For example, an owning entity obtains a vehicle 210 as shown in FIG. 33. Vehicle 210 includes an alternator that draws mechanical power from crankshaft 226 and generates electrical energy. The electrical energy is supplied to an inverter to generate a DC voltage, and the DC voltage charges a battery.

In a second step (step 302), an owning entity provides a wheeled automotive vehicle to a retrofitting entity. The owning entity decides to modify the wheeled automotive vehicle to include a secondary power generation system. For example, vehicle 210 of FIG. 33 includes the primary power generation system, however the battery within the engine compartment is not sufficient to power an auxiliary device. The owning entity would like to install a secondary power generation system to power the auxiliary device present on vehicle 210. The auxiliary device is not involved in driving or operating vehicle 210, but serves a secondary purpose. For example, the auxiliary device may be a refrigeration system for cooling items transported by vehicle 210. Instead of installing a separate gasoline powered generator, owning entity elects to install the novel secondary power generation system that draws power directly from the vehicle engine and does not require extra fuel to operate.

In a third step (step 303), the retrofitting entity couples a first coupling mechanism of the MPTS to the crankshaft of the engine. The first coupling mechanism is disposed within the engine compartment. For example, in FIG. 38, first coupling mechanism 217 is coupled to crankshaft 226 of engine 227. The first coupling mechanism 217 is disposed within the engine compartment 221.

In a fourth step (step 304), the retrofitting entity couples a second coupling mechanism of the MPTS to a generator shaft of the electrical generator. The retrofitting entity also uses the second coupling mechanism to attach the electrical generator to the vehicle. The second coupling mechanism and the electrical generator are disposed outside of the engine compartment. For example, in FIG. 38, the second coupling mechanism 219 is coupled to electrical generator 216. The second coupling mechanism 219 attaches electrical generator 216 to a cross member of chassis 212. Electrical generator 216 and generator 216 are disposed outside of the engine compartment.

In a fifth step (step 305), the retrofitting entity couples the first coupling mechanism to the second coupling mechanism using a shaft. A first end of the shaft couples to the first coupling mechanism, and a second end of the shaft couples to the second coupling mechanism. The first coupling mechanism, the shaft, and the second coupling mechanism form a mechanical linkage. The mechanical linkage extends from the crankshaft to the generator shaft. The mechanical linkage effectively couples the crankshaft to the generator shaft. The mechanical linkage does not include a Power Take-Off (PTO) system, clutch, or disengagement mechanism. The mechanical linkage cannot be selectively disengaged by an operator of the vehicle, therefore electrical generator operates as long as the vehicle engine is operating. For example, in FIG. 38, shaft 218 couples the first coupling mechanism 217 to the second coupling mechanism 219. First coupling mechanism 217, shaft 218, and second coupling mechanism 219 form a mechanical linkage that extends from crankshaft 226 to generator shaft 219. The mechanical linkage is always engaged and cannot be disengaged by an operator of vehicle 210. In order to prevent secondary power generation system 215 from operating, the MPTS or electrical generator 216 would have to be uninstalled. Alternatively, generator 216 may have an OFF switch, however, generator shaft would remain engaged if the MPTS were present and engine 227 were operating.

Although certain specific exemplary embodiments are described above in order to illustrate the invention, the invention is not limited to the specific embodiments. For example, the first and second coupling mechanisms may include varying amounts, combinations and dimensions of pulleys. The examples illustrated in FIGS. 9, 25 and 30 are only a few particular examples. The amount, combination and dimension of pulleys selected depends upon the operating characteristics of the engine and electrical generator. In addition, the type of coupling device that is selected is determined by the desired pulley ratios as well as physical area and installation constraints. There are several ways of coupling the first coupling mechanism to the engine, and the examples shown in FIGS. 4 and 36 are but one of several ways of attachment. For example, the first coupling mechanism need not be coupled directly to the crankshaft and may instead be coupled to an auxiliary pulley along the belt system of the vehicle. Accordingly, various modifications, adaptations, and combinations of various features of the described embodiments can be practiced without departing from the scope of the invention as set forth in the claims.

What is claimed is:

1. A method comprising:
    (a) coupling a first coupling mechanism to a crankshaft, wherein the first coupling mechanism comprises a first pulley and a second pulley, wherein the crankshaft is part of an internal combustion engine, and wherein the crankshaft and the internal combustion engine are disposed within an engine compartment;
    (b) coupling a second coupling mechanism to a generator shaft of an electrical generator, wherein the electrical generator is disposed outside of the engine compartment; and
    (c) coupling a first end of a shaft to the first coupling mechanism and a second end of the shaft to the second coupling mechanism such that a rotation of the crankshaft engages the generator shaft, wherein the first pulley of the first coupling mechanism is coupled to the crankshaft and the second pulley of the first coupling mechanism is coupled to the shaft.

2. The method of claim 1, wherein the shaft extends a first distance along a first axis, wherein the crankshaft extends a second distance along a second axis, wherein the first axis is substantially parallel to the second axis, and wherein the first distance is greater than the second distance.

3. The method of claim 2, wherein the first distance is greater than one foot.

4. The method of claim 1, wherein the steps of (a), (b) and (c) form a mechanical linkage between the crankshaft and the generator shaft, and wherein the mechanical linkage does not comprise any element taken from the group consisting of: a gear, a clutch, a Power Take-Off (PTO) unit, and a hydraulic pump.

5. The method of claim 1, wherein the engine compartment comprises a firewall, and wherein the crankshaft and the generator shaft are separated by the engine compartment.

6. The method of claim 5, wherein the engine compartment further comprises an opening portion, and wherein the shaft extends through the opening portion.

7. The method of claim 1, wherein the rotation of the crankshaft in step (c) engages the electrical generator thereby generating electrical energy, and wherein the electrical energy generated by the electrical generator is not consumed inside the engine compartment.

8. The method of claim 1, wherein the first coupling mechanism, the second coupling mechanism, and the shaft form a linkage, wherein the linkage does not comprise a mechanism for selectively engaging and disengaging the linkage, and wherein the linkage is always engaged such that a rotation of the crankshaft rotates the generator shaft.

9. A method comprising:
    (a) coupling a first coupling mechanism to a crankshaft, wherein the crankshaft is part of an internal combustion engine, and wherein the crankshaft and the internal combustion engine are disposed within an engine compartment;
    (b) coupling a second coupling mechanism to a generator shaft of an electrical generator, wherein the electrical generator is disposed outside of the engine compartment; and
    (c) coupling a first end of a shaft to the first coupling mechanism and a second end of the shaft to the second coupling mechanism such that a rotation of the crankshaft engages the generator shaft, and wherein the step of (b) is performed before the step of (a).

10. A method comprising:
    (a) using a first coupling mechanism to couple a crankshaft to a first end of a shaft, wherein the first coupling mechanism has a first pulley coupled to the crankshaft and a second pulley coupled to the first end of the shaft, wherein the crankshaft is part of an internal combustion engine, wherein the crankshaft and the internal combustion engine are disposed within an engine compartment, wherein the first coupling mechanism is attached to a portion of the engine, and wherein the first coupling mechanism is disposed within the engine compartment; and
    (b) using a second coupling mechanism to couple a generator shaft to a second end of the shaft such that a rotation of the crankshaft rotates the generator shaft, wherein the generator shaft is part of an electrical generator, and wherein the electrical generator is disposed outside of the engine compartment.

11. The method of claim 10, wherein the shaft extends a first distance along a first axis, wherein the crankshaft extends a second distance along a second axis, wherein the first axis is substantially parallel to the second axis, and wherein the first distance is greater than the second distance.

12. The method of claim 10, wherein the steps of (a) and (b) form a linkage that extends from the crankshaft to the generator shaft, and wherein the linkage does not comprise any element taken from the group consisting of: a gear, a clutch, a Power Take-Off (PTO) unit, and a hydraulic pump.

13. The method of claim 10, wherein the engine compartment comprises a firewall, and wherein the crankshaft and the generator shaft are separated by the engine compartment.

14. The method of claim 13, wherein the engine compartment further comprises an opening portion, and wherein the shaft extends through the opening portion.

15. The method of claim 10, wherein the rotation of the crankshaft in step (b) engages the electrical generator thereby generating electrical energy, and wherein the electrical energy generated by the electrical generator is not consumed inside the engine compartment.

16. The method of claim 10, wherein the first coupling mechanism, the second coupling mechanism, and the shaft form a linkage, wherein the linkage does not comprise a mechanism for selectively engaging and disengaging the linkage, and wherein the linkage is always engaged such that a rotation of the crankshaft engages the electrical generator.

17. An apparatus comprising:
   a pulley that is coupled to a crankshaft of an internal combustion engine, wherein the internal combustion engine is disposed within an engine compartment; and
   means for transferring a torque of the crankshaft to a shaft of an electrical generator disposed outside of the engine compartment thereby rotating the shaft of the electrical generator when the crankshaft rotates, wherein a portion of the means is disposed within the engine compartment and another portion of the means is disposed outside of the engine compartment, and wherein the means extends through the engine compartment.

18. The apparatus of claim 17, wherein the means comprises a first coupling mechanism, a second coupling mechanism, and a shaft having a first end and a second end, wherein the first coupling mechanism is disposed within the engine compartment, wherein the second coupling mechanism is disposed outside of the engine compartment, wherein the first coupling mechanism couples the pulley to the first end of the shaft, and wherein the second coupling mechanism couples the second end of the shaft to the shaft of the electrical generator.

19. The apparatus of claim 17, wherein the means does not comprise any element taken from the group consisting of: a gear, a clutch, a Power Take-Off (PTO) unit, and a hydraulic pump.

20. The apparatus of claim 17, wherein the means does not comprise a mechanism for selectively engaging and disengaging the means.

* * * * *